United States Patent
Tsukagoshi

(10) Patent No.: US 11,317,170 B2
(45) Date of Patent: *Apr. 26, 2022

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/919,857

(22) Filed: Jul. 2, 2020

(65) Prior Publication Data

US 2020/0374601 A1    Nov. 26, 2020

Related U.S. Application Data

(63) Continuation of application No. 15/761,278, filed as application No. PCT/JP2016/080748 on Oct. 17, 2016, now Pat. No. 10,708,671.

(30) Foreign Application Priority Data

Oct. 22, 2015  (JP) ................................. 2015-208445

(51) Int. Cl.
*H04N 21/84* (2011.01)
*H04N 21/235* (2011.01)
(Continued)

(52) U.S. Cl.
CPC .......... *H04N 21/84* (2013.01); *H04N 21/235* (2013.01); *H04N 21/236* (2013.01);
(Continued)

(58) Field of Classification Search
None
See application file for complete search history.

(56) References Cited

U.S. PATENT DOCUMENTS

2014/0125696 A1    5/2014    Newton et al.
2015/0208095 A1    7/2015    Schierl
(Continued)

FOREIGN PATENT DOCUMENTS

CA    2 936 318 A1    8/2015
CA    2 939 065 A1    8/2015
(Continued)

OTHER PUBLICATIONS

Combined Chinese Office Action and Search Report dated May 29, 2020 in Patent Application No. 201680059916.1 (with English language translation), 15 pages.
(Continued)

*Primary Examiner* — James R Marandi
(74) *Attorney, Agent, or Firm* — Oblon, McClelland, Maier & Neustadt, L.L.P.

(57) ABSTRACT

There is provided a transmission device including: a transmission unit that transmits a container in a predetermined format including a first component stream that has, as component data, transmission video data obtained by switching between a plurality of types of transmission video data, and a predetermined number of second component streams that have pieces of other component data; and an information insertion unit that inserts dynamic range information of the component data that each of the component streams has into the component streams.

17 Claims, 17 Drawing Sheets

(51) Int. Cl.
  *H04N 21/236* (2011.01)
  *H04N 21/434* (2011.01)
  *H04N 21/431* (2011.01)
  *H04N 21/2365* (2011.01)
  *H04N 21/435* (2011.01)
  *H04N 21/2362* (2011.01)
  *G06T 5/00* (2006.01)

(52) U.S. Cl.
  CPC ... *H04N 21/2365* (2013.01); *H04N 21/23614* (2013.01); *H04N 21/435* (2013.01); *H04N 21/4318* (2013.01); *H04N 21/4347* (2013.01); *H04N 21/4348* (2013.01); *G06T 5/007* (2013.01); *H04N 21/2362* (2013.01)

(56) References Cited

U.S. PATENT DOCUMENTS

| | | |
|---|---|---|
| 2015/0245004 A1 | 8/2015 | Guo et al. |
| 2016/0163356 A1 | 6/2016 | De Haan |
| 2016/0191929 A1 | 6/2016 | Hwang et al. |
| 2016/0345032 A1 | 11/2016 | Tsukagoshi |
| 2017/0085894 A1 | 3/2017 | Ramasubramonian |

FOREIGN PATENT DOCUMENTS

| | | |
|---|---|---|
| JP | 2014-528182 A | 10/2014 |
| JP | 2015-8361 A | 1/2015 |
| JP | 2016-111692 A | 6/2016 |
| JP | 2018-530237 A | 10/2018 |
| WO | WO 2014/178286 A1 | 11/2014 |
| WO | WO 2015/007910 A1 | 1/2015 |
| WO | WO 2015/034306 A1 | 3/2015 |

OTHER PUBLICATIONS

Office Action dated Feb. 18, 2019 in corresponding European Patent Application No. 16 790 737.7, 7 pages.

Borer T., "Non-linear Opto-Electrical Transfer Functions for High Dynamic Range Television", BBC Research & Development, White Paper WHP 283, Jul. 2014, 23 pages.

International Search Report dated Dec. 6, 2016 in PCT/JP2016/080748 filed Oct. 17, 2016.

| Syntax | No. of Bits | Format |
|---|---|---|
| HDR_video_descriptor( ) { | | |
| descriptor_tag | 8 | bslbf |
| descriptor_length | 8 | bslbf |
| HDR_SDR_flag | 1 | bslbf |
| video_characterestics_info_flag | 1 | bslbf |
| reserved | 6 | 0xf |
| if( video_characteristics_info_flag ) { | | |
| transferfunction | 8 | uimsbf |
| color_space | 8 | uimsbf |
| referencelevel | 8 | uimsbf |
| } | | |
| content_peak_luminance | 8 | uimsbf |
| } | | |

FIG. 5

Semantics

| | | |
|---|---|---|
| HDR_SDR_flag | | |
| | "1" | TARGET STREAM IS HDR |
| | "0" | TARGET STREAM IS SDR |
| video_characteristics_info_flag | | |
| | 1 | WHEN THERE IS CHARACTERISTIC INFORMATION |
| | 0 | WHEN THERE IS NO CHARACTERISTIC INFORMATION |
| color_space | | |
| | "1" | BT.709-5 |
| | "9" | BT.2020 |
| | "10" | SMPTE 428 or XYZSDR_mapping_type |
| transferfunction | | |
| | "1" | BT.709-5 Transfer Function (SDR) |
| | "14" | 10bit BT.2020 Transfer Function (SDR) |
| | "16" | SMPTE 2084 Transfer Function (HDR1) |
| | "25" | HDR2 |
| referencelevel | | |
| | 0~100 | VALUE IN RELATIVE-RANGE IN WHICH VALUES ARE NORMALIZED TO "1" AT MAXIMUM IS DESIGNATED TO BE VALUE FROM 0 TO 100, AND RESULT OBTAINED BY DIVIDING THIS VALUE BY 100 IS RECOGNIZED AS REFERENCE LEVEL |
| content_peak_luminance | | INDICATE RELATIVE LUMINANCE VALUE (EXPRESSED IN %) CORRESPONDING TO PEAK VALUE OF TRANSMISSION CODE INCLUDED IN IMAGE |

FIG. 6

| Syntax | No. of Bits | Format |
|---|---|---|
| HDR_subtitle_descriptor( ) { | | |
| descriptor_tag | 8 | bslbf |
| descriptor_length | 8 | bslbf |
| HDR_SDR_flag | 1 | bslbf |
| subtitle_display_characterestics_info_flag | 1 | bslbf |
| reserved | 5 | 0x1f |
| if( subtitle_display_characterestics_info_flag ) { | | |
| transferfunction | 8 | uimsbf |
| color_space | 8 | uimsbf |
| referencelevel | 8 | uimsbf |
| } | | |
| } | | |

FIG. 7

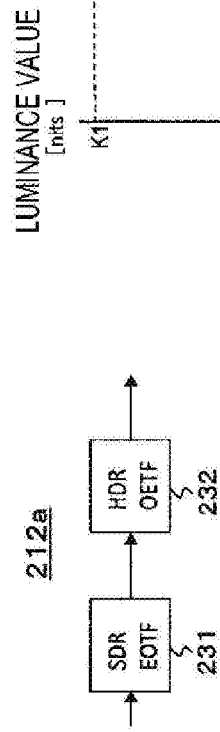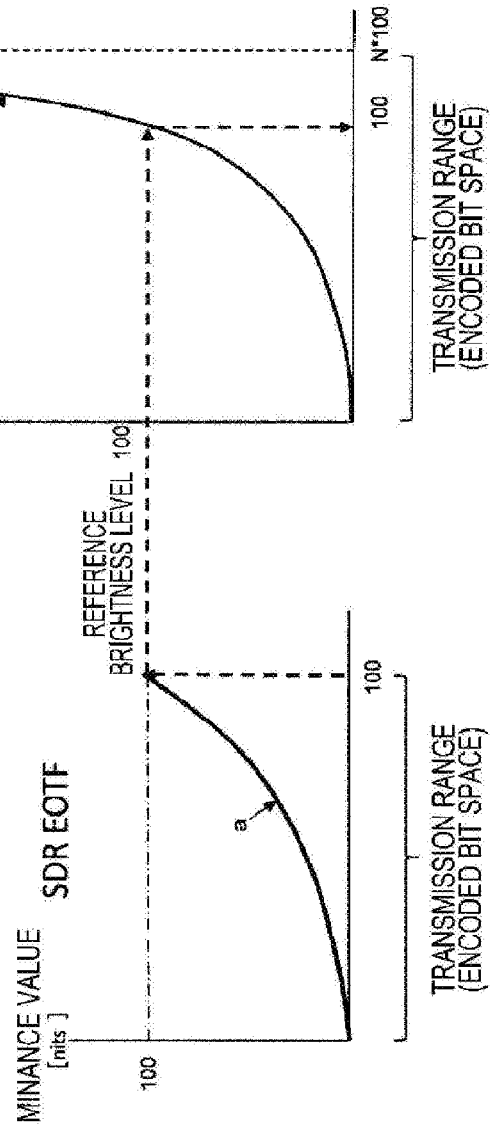
FIG. 14(a) FIG. 14(b) FIG. 14(c)

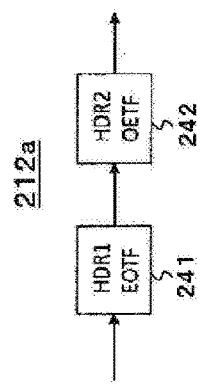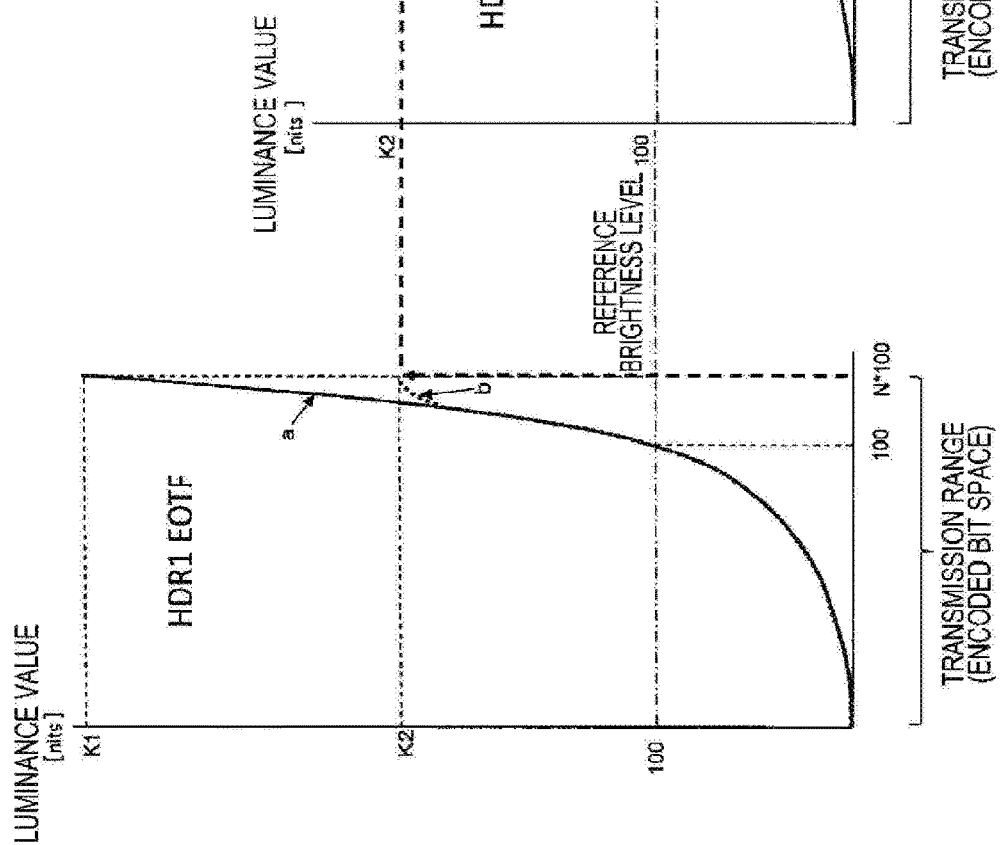

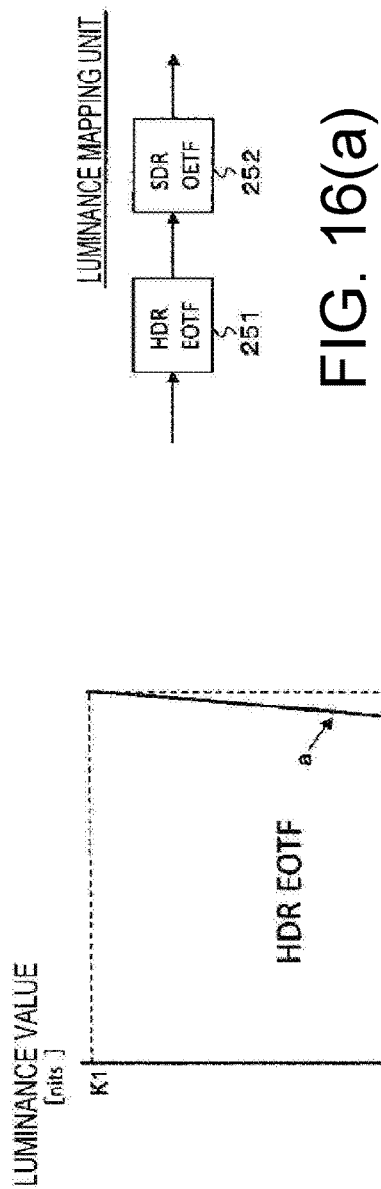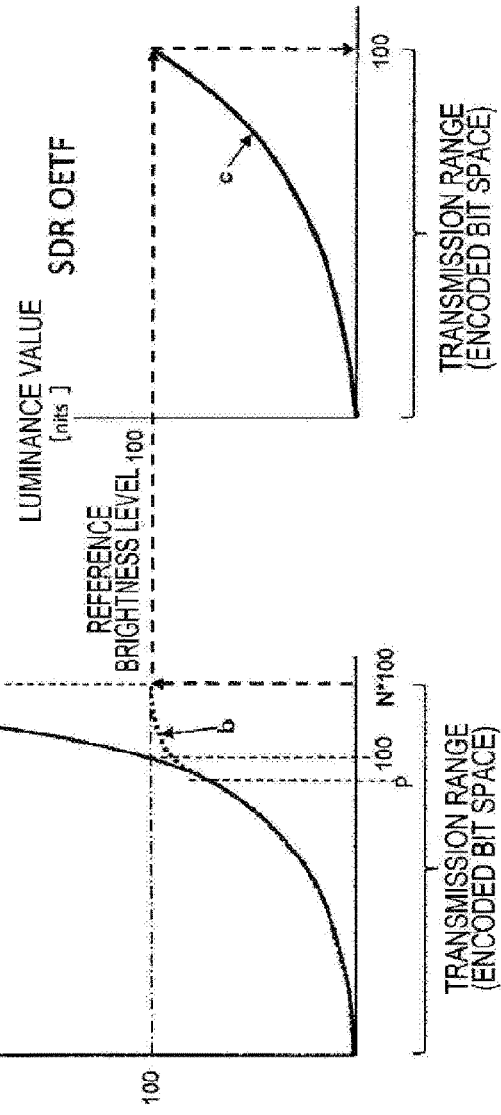
FIG. 16(a)
FIG. 16(b)
FIG. 16(c)

TRANSMISSION DEVICE, TRANSMISSION METHOD, RECEPTION DEVICE, AND RECEPTION METHOD

CROSS REFERENCE TO RELATED APPLICATIONS

This application is a Continuation of U.S. patent application Ser. No. 15/761,278, filed Mar. 19, 2018, which is a National Phase of PCT Application No. PCT/JP2016/080748, filed Oct. 17, 2016 which claims the benefit of Japanese Priority Patent Application JP 2015-208445 filed Oct. 22, 2015, the entire contents of each of which are incorporated herein by reference.

TECHNICAL FIELD

The present technology relates to a transmission device, a transmission method, a reception device, and a reception method, and particularly to a transmission device and the like for transmitting not only video streams but also other streams having graphics data, subtitle data, and the like.

BACKGROUND ART

There are cases in which standard dynamic range transmission video data and high dynamic range transmission video data are mixed and transmitted. Hereinafter, standard dynamic range will be referred to as "SDR" and high dynamic range will be referred to as "HDR" appropriately. In this case, the SDR transmission video data is data obtained by applying an SDR opto-electrical transfer to SDR video data, and the HDR transmission video data is data obtained by applying an HDR opto-electrical transfer to HDR video data. NPL 1, for example, describes an HDR opto-electrical transfer characteristic (a new gamma characteristic) that includes a compatible area with an existing opto-electrical transfer characteristic (gamma characteristic) considering reception of an existing receiving device.

There is a possibility of switching of SDR transmission video data and HDR transmission video data occurring, for example, at timings of program switching or insertion of commercials. When such switching occurs, it is necessary for a reception side to switch electro-optical transfer characteristics; however, an image disturbance occurs resulting from the switching, or display muting is performed to hide the image disturbance.

As an example in which an image disturbance can be distinctly perceived, there is graphics display through an operation of a so-called "d (data broadcasting) button," which is provided as one of broadcasting services. In this case, although graphics are superimposed over a program or a commercial, when an image displayed in a small window based on video data is switched from SDR to the HDR or from HDR to SDR, a change occurs in color or brightness of the graphics display.

CITATION LIST

Non Patent Literature

NPL 1: Tim Borer, "Non-Linear Opto-electrical Transfer Functions for High Dynamic Range Television," Research & Development White Paper WHP 283, July 2014

SUMMARY OF INVENTION

Technical Problem

It is desirable for the present technology to satisfactorily prevent an image disturbance from occurring on a reception side when a plurality of mixed types of transmission video data with different dynamic ranges are transmitted.

Solution to Problem

A concept of the present technology is a transmission device including:

a transmission unit that transmits a container in a predetermined format including a first component stream that has, as component data, transmission video data obtained by switching between a plurality of types of transmission video data, and a predetermined number of second component streams that have pieces of other component data; and an information insertion unit that inserts dynamic range information of the component data that each of the component streams has into the component streams.

In an embodiment of the present technology, by a transmission unit, a container in a predetermined format including a first component stream that has, as component data, transmission video data obtained by switching between a plurality of types of transmission video data, and a predetermined number of second component streams that have pieces of other component data is transmitted. For example, the predetermined number of second component streams may include a data broadcasting stream and/or a subtitle stream. By an information insertion unit, dynamic range information of the component data that each of the component streams has is inserted into the component streams.

In an embodiment of the present technology described above, the dynamic range information of the component data that each of the component streams has is inserted into the component streams. Thus, a reception side can obtain output data by performing a luminance mapping process on the component data based on its dynamic range information thereof to match display performance and performing compositing of the data.

In this case, because a characteristic of an electro-optical transfer performed on the output data can be fixed, an image disturbance caused by switching the electro-optical transfer characteristic can be prevented from occurring. When, for example, graphics are displayed along with an image based on video data, even if the image based on the video data is switched from SDR to HDR or from HDR to SDR, no change occurs in color or brightness of the graphics display. In addition, in this case, since the luminance mapping process is performed on the component data to match display performance, display based on the component data can be performed in a proper luminance state at all times.

Note that, in an embodiment of the present technology, for example, the information insertion unit may further insert color gamut information of the component data that each of the component streams has into the component streams. In this case, the reception side can obtain output data by performing a color gamut conversion on the component data based on its color gamut information to match display performance and performing compositing on the data, and can perform display based on the component data in a proper color state at all times.

In an embodiment of the present technology, for example, another information insertion unit that inserts identification information indicating a type of transmission video data that the first component stream included in the container has into a layer of the container so that the identification information indicates a type of the transmission video data after the switching from a timing a predetermined amount of time or more earlier than a switching timing may be further included. In this case, the reception side can recognize the fact that the type of the transmission video data has been switched and further the type of the transmission video data after the switching from the timing a predetermined amount of time or more earlier than the switching timing.

Another concept of the present technology is a reception device including:

a reception unit that receives a container in a predetermined format including a first component stream that has, as component data, transmission video data obtained by switching between a plurality of types of transmission video data, and a predetermined number of second component streams that have pieces of other component data; and a processing unit that obtains output data by decoding each of the component streams, thus obtaining a plurality of pieces of component data, and then performing compositing of the obtained plurality of pieces of component data, Dynamic range information of the component data that each of the component streams has is inserted into the component streams, and the processing unit obtains the output data by performing a luminance mapping process on each piece of the component data based on the dynamic range information of each piece of the component data to match display performance, and then performing compositing of the component data.

In an embodiment of the present technology, by a reception unit, a container in a predetermined format including a first component stream that has, as component data, transmission video data obtained by switching between a plurality of types of transmission video data, and a predetermined number of second component streams that have pieces of other component data is received. Dynamic range information of the component data that each of the component streams has is inserted into the component streams.

The processing unit decodes each of the component streams to obtain a plurality of pieces of component data, and performs compositing on the plurality of pieces of component data to obtain output data. The processing unit obtains the output data by performing a luminance mapping process on each piece of the component data based on its dynamic range information to match display performance and performs compositing of the data.

In an embodiment of the present technology described above, each piece of component data undergoes a luminance mapping process based on its dynamic range information to match display performance and be composited, and thereby output data is obtained. Thus, a characteristic of an electro-optical transfer performed on the output data can be fixed, and occurrence of image disturbance caused by switching of the electro-optical transfer characteristic can be prevented. In addition, display based on the component data can be performed in a proper luminance state at all times.

In an embodiment of the present technology, for example, color gamut information of the component data that each of the component streams has may be inserted into the component streams, and the processing unit may obtain the output data by performing a color gamut conversion process on each piece of the component data based on the color gamut information of each piece of the component data to match display performance, and then performing compos-iting of the component data. In this case, display based on the component data can be performed in a proper color state at all times.

Advantageous Effects of Invention

According to an embodiment of the present technology, it is possible to satisfactorily prevent an image disturbance from occurring at a reception side when a plurality of mixed types of transmission video data having different dynamic ranges are transmitted. Note that effects described in the present specification are merely illustrative and are not limitative, and additional effects may be exhibited.

BRIEF DESCRIPTION OF DRAWINGS

FIG. 5 is a table showing an example of a structure of HDR video descriptor.

FIG. 6 is a diagram showing content of principal information in the example of the structure of the HDR video descriptor.

FIG. 7 is a table showing an example of a structure of an HDR subtitle descriptor.

FIG. 14(a), FIG. 14(b), and FIG. 14(c) are diagrams for describing the luminance mapping unit when display performance is HDR and input transmission video data is SDR transmission video data.

FIG. 15(a), FIG. 15(b), and FIG. 15(c) are diagrams for describing the luminance mapping unit when display performance is HDR and input transmission video data is HDR transmission video data.

FIG. 16(a), FIG. 16(b), and FIG. 16(c) are diagrams for describing the luminance mapping unit when display performance is SDR and input transmission video data is HDR transmission video data.

DESCRIPTION OF EMBODIMENTS

Hereinafter, embodiments for implementing the technology (hereinafter referred to as "embodiments") will be described. Note that the description will be provided in the following order.

1. Embodiment
2. Modified Example

1. Embodiment (Configuration Example of a Transmission and Reception System)

Figure 1:
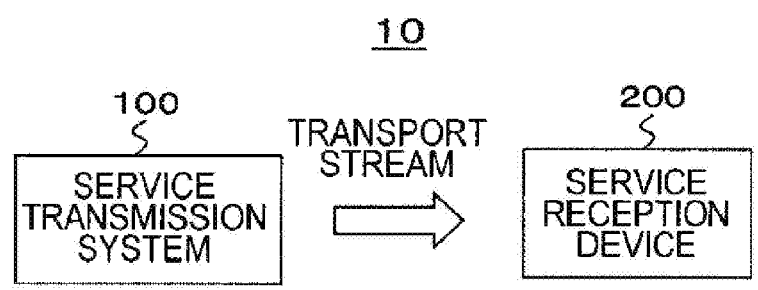
FIG. 1 is a block diagram showing an example of a configuration of a transmission and reception system as an embodiment.

FIG. 1 shows a configuration example of a transmission and reception system 10 as an embodiment. The transmission and reception system 10 is constituted by a service transmission system 100 and a service reception device 200. The service transmission system 100 generates an MPEG-2 transport stream (TS) or a transport stream of MPEG media transport (MMT) (multiplexed stream) as a container, and puts the transport stream on a broadcasting wave or packets of a network to transmit the transport stream.

The transport stream includes a first component stream (a video stream) having transmission video data obtained by switching between a plurality of types of transmission video data as component data and a predetermined number of second component streams having other component data. The predetermined number of second component streams include, for example, a data service stream (a data broadcasting stream) and/or a subtitle stream, and particularly in the embodiment, include a data broadcasting stream and a subtitle stream. A data service stream has, for example, graphics data, image data, and the like as component data. A subtitle stream has subtitle data as component data.

Dynamic range information of component data that each component stream has is inserted into the component stream. In addition, color gamut information of the component data that each component stream has is inserted into the component stream. Furthermore, identification information indicating a type of transmission video data included in the transport stream that the first component stream has is inserted into the transport stream to indicate the type of transmission video data after the switching from a timing a predetermined amount of time or more earlier than a switching timing.

The service reception device 200 receives the above-described transport stream (an MPEG-2 transport stream or a transport stream of MMT) transmitted from the service transmission system 100. The service reception device 200 decodes each of the component streams to obtain a plurality of pieces of component data, and performs compositing on the plurality of obtained pieces of component data to obtain output data.

In this case, respective pieces of the component data undergo a luminance mapping process based on dynamic range information of the component data to match display performance and compositing, and thereby the output data is obtained. Furthermore, in this embodiment, the respective pieces of the component data undergo a color gamut conversion process based on color gamut information of the component data to match the display performance and compositing, and thereby the output data is obtained.

The service reception device 200 obtains display image data by performing an electro-optical transfer (to fix an electro-optical transfer characteristic) on the output data, and then performs image display based on this display image data.

(Configuration Example of Service Transmission System)

Figure 2:
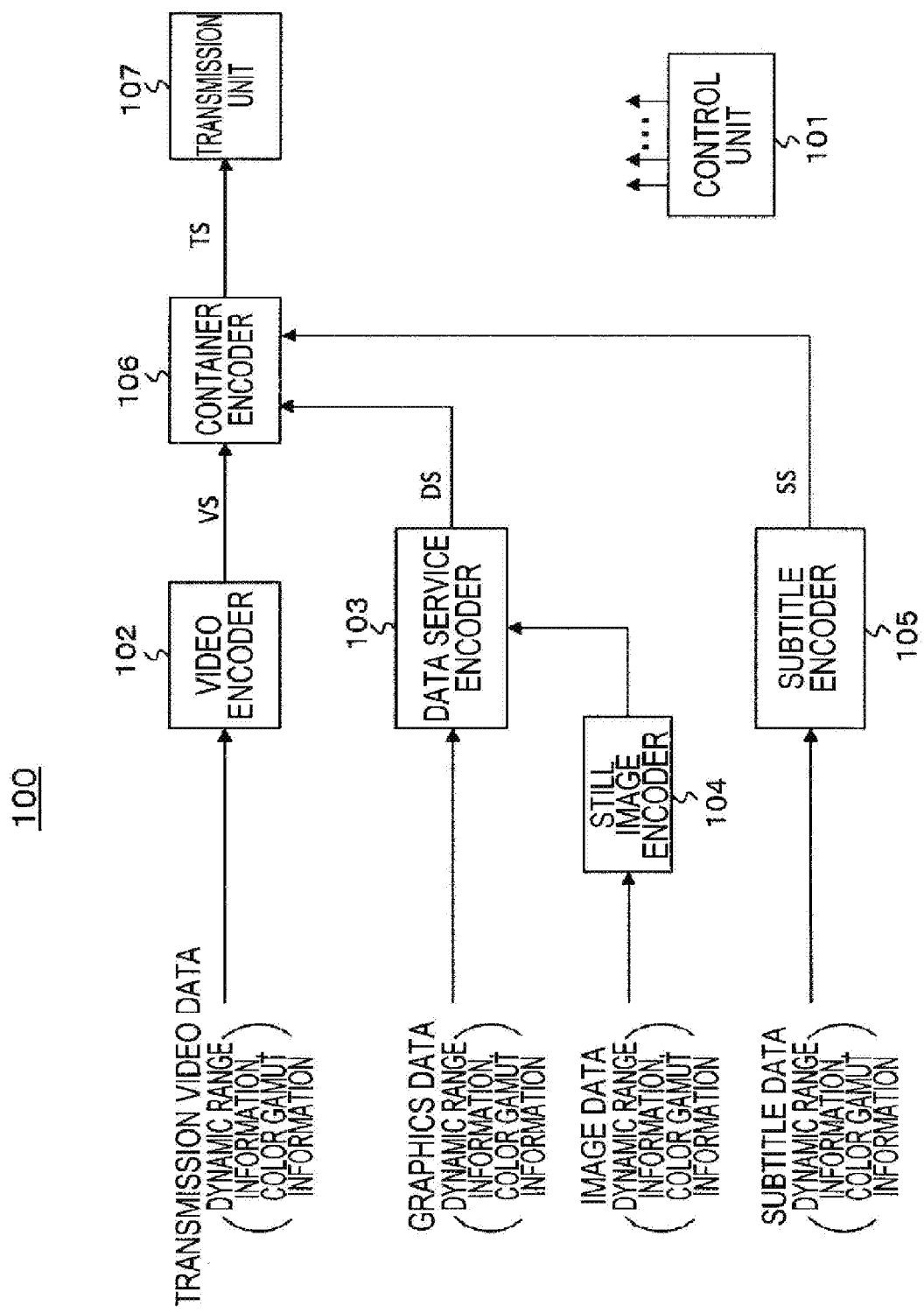
FIG. 2 is a block diagram showing an example of a configuration of a service transmission system.

FIG. 2 shows a configuration example of the service transmission system 100. This service transmission system 100 has a control unit 101, a video encoder 102, a data service encoder 103, a still image encoder 104, a subtitle encoder 105, a container encoder 106, and a transmission unit 107.

The control unit 101 is configured to include a central processing unit (CPU) to control operations of the units of the service transmission system 100 based on a control program. The video encoder 102 performs encoding, for example, MPEG4-AVC or HEVC on input transmission video data to obtain encoded video data, and then generates a video stream VS as a component stream including the encoded video data. The video stream VS includes the transmission video data as component data.

The input transmission video data is obtained by switching between a plurality of types of transmission video data. The plurality of types of transmission video data includes, for example, standard dynamic range (SDR) transmission video data and high dynamic range (HDR) transmission video data. Here, the SDR transmission video data is obtained by applying a SDR opto-electrical transfer to SDR video data. In addition, the HDR transmission video data is obtained by applying an HDR opto-electrical transfer to HDR video data.

Figure 3:
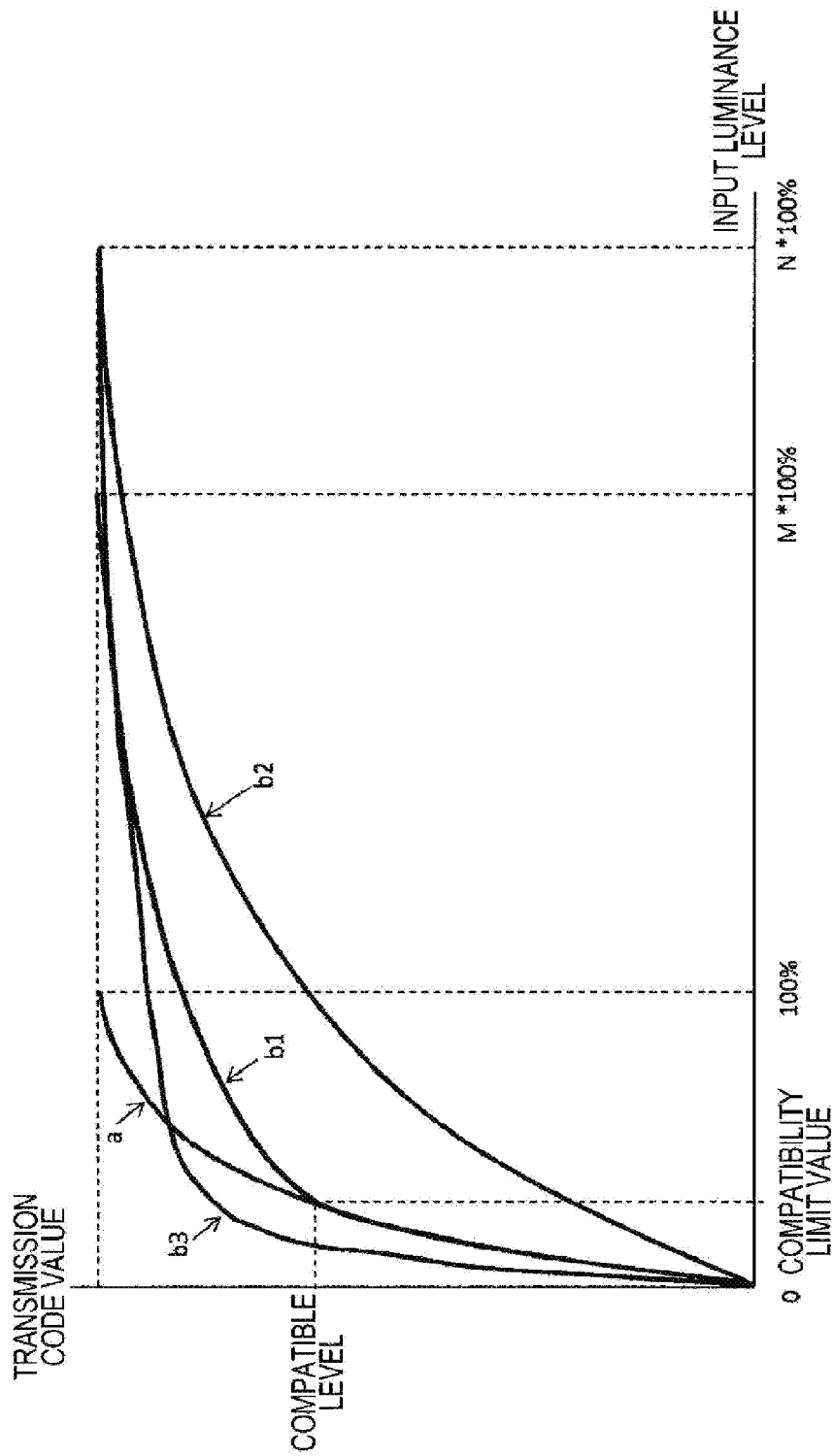
FIG. 3 is a graph for describing opto-electrical transfer characteristics.

FIG. 3 shows an example of so-called opto-electrical transfer characteristics indicating characteristics of non-linear luminance code values that are used to transfer linear luminance of light in a physical space to a transmission space of a limited band. In this drawing, the horizontal axis represents an input luminance level, and the vertical axis represents a transmission code value. A curve a indicates an example of an SDR opto-electrical transfer characteristic that is applied to SDR video data having input luminance levels of 0 to 100%. In addition a curve b1 indicates an example of an HDR opto-electrical transfer characteristic (an example compatible with the SDR opto-electrical transfer characteristic) that is applied to HDR video data having input luminance levels of 0 to N*100%. The characteristic of this example coincides with the SDR opto-electrical transfer characteristic up to a compatibility limit value of the input luminance level. When the input luminance level reaches the compatibility limit value, the transmission code value becomes a compatible level.

In addition, a curve b2 indicates an example of an HDR opto-electrical transfer characteristic (an example not compatible with the SDR opto-electrical transfer characteristic) that is applied to HDR video data having input luminance levels of 0 to N*100%. Furthermore, a curve b3 indicates an example of HDR opto-electrical transfer characteristic (an example not compatible with the SDR opto-electrical transfer characteristic) having input luminance levels of 0 to M*100%. Here, N and M are numbers greater than 1, and M<N. Note that, although M<N is set in this illustrated example, a relation of maximum luminance between b2 and b3 may be M>=N in general cases.

Returning to FIG. 2, the video encoder 102 receives input of dynamic range information and color gamut information of the input transmission video data. The video encoder 102 inserts the dynamic range information and color gamut information into the video stream VS. Here, the dynamic range information is information indicating an electro-optical transfer characteristic corresponding to an opto-electrical transfer characteristic that the transmission video data has (a transfer function).

At this point, the video encoder 102 inserts meta information such as the information indicating the electro-optical transfer characteristic corresponding to the opto-electrical transfer characteristic that the transmission video data has (the transfer function), the color gamut information of the transmission video data, information indicating a reference level, and the like into a video usability information (VUI) region of an SPS NAL unit of an access unit (AU). In addition, the video encoder 102 inserts an SEI message having the meta information such as the information indicating the electro-optical transfer characteristic corresponding to the opto-electrical transfer characteristic that the transmission video data has (the transfer function) and the information of the reference level into an "SEI" part of the access unit (AU).

Here, the reason for causing the SEI message to have the information indicating the electro-optical transfer characteristic is that, when an HDR opto-electrical transfer characteristic is compatible with an SDR opto-electrical transfer characteristic even though transmission video data is HDR transmission video data, information indicating an electro-optical transfer characteristic corresponding to the SDR opto-electrical transfer characteristic (a gamma characteristic) is inserted into the VUI of the SPS NAL unit to help an existing SDR-responsive reception device to identify the characteristic, and thus in order for an HDR-responsive reception device to identify a video that the device received as HDR, information indicating an electro-optical transfer characteristic corresponding to the HDR opto-electrical transfer characteristic is necessary at a location other than the VUI.

In addition, the reason for causing the SEI message to have the reference level information is that, when transmission video data V1 is SDR transmission video data, information indicating the electro-optical transfer characteristic corresponding to the SDR opto-electrical transfer characteristic (the gamma characteristic) is inserted into the VUI of the SPS NAL unit, but there is no description on a standard for insertion of the reference level.

In this case, the information indicating the electro-optical transfer characteristic (the transfer function) represents an electro-optical transfer characteristic of, for example, "BT.709-5 transfer function (SDR)," "10-bit BT.2020 transfer function (SDR)," "SMPTE 2084 transfer function (HDR1)," "HDR (HDR2)," or the like. Note that "HDR (HDR2)" is a transfer characteristic partially having the same kind of characteristic as the gamma characteristic from the past, rather than a characteristic supporting a "human visual system." In addition, the color gamut information represents a color gamut of "BT.709-5," "BT.2020," or "SMPTE 428 or XYZ."

The still image encoder 104 performs, for example, JPEG encoding on the input image data to obtain encoded video data. The still image encoder 104 receives input of dynamic range information and color gamut information of the image data. The still image encoder 104 inserts the dynamic range information and color gamut information into the encoded data. Here, the dynamic range information is information indicating an electro-optical transfer characteristic (a transfer function) corresponding to an opto-electrical transfer characteristic that the image data has.

For the information indicating the electro-optical transfer characteristic (the transfer function), the still image encoder 104 uses, for example, a value of a gamma tag stipulated in an Exchangeable image file format (Exif) standard defined in the JPEG standard. Currently, "16 (gamma=BT.709-5 transfer function (SDR))" is defined; however, for other values, "10-bit BT.2020 transfer function (SDR)," "SMPTE 2084 transfer function (HDR1)," "HDR (HDR2)," and the like are defined and used.

In addition, for the color gamut information, the still image encoder 104 uses, for example, a value of a color space tag stipulated in the Exif standard defined in the JPEG standard. Currently, "1 (sRGB=BT.709-5)" is defined; however, for other values, "BT.2020," "SMPTE 428 or XYZ," and the like are defined and used.

The data service encoder 103 performs an encoding process on the input graphics data and further on the encoded data input from the still image encoder 104, and thereby generates a data service stream DS as a component stream. The data service stream DS includes image data and graphics data as component data.

The data service encoder 103 receives input of dynamic range information and color gamut information of the graphics data. The data service encoder 103 inserts the dynamic range information and color gamut information into the data service stream DS. Here, the dynamic range information is the information indicating an electro-optical transfer characteristic (the transfer function) corresponding to an opto-electrical transfer characteristic that the graphics data has.

For the information indicating the electro-optical transfer characteristic (the transfer function), the data service encoder 103, for example, defines expanded dynamic range information "D_range" as representing "BT.709-5 transfer function (SDR)," "10-bit BT.2020 transfer function (SDR)," "SMPTE 2084 transfer function (HDR1)," "HDR (HDR2)," or the like. In addition, for the color gamut information, the data service encoder 103 uses, for example, the item of "gfx.color_management.mode" to indicate a color gamut of "BT.709-5," "BT.2020," "SMPTE 428 or XYZ," or the like.

The subtitle encoder 105 performs an encoding process on the input subtitle data, and thereby generates a subtitle stream SS as a component stream. The subtitle stream SS includes subtitle data as component data. Although detailed description thereof is omitted, the subtitle stream SS includes text information of subtitles such as Timed Text Markup Language (TTML), or bitmap data of subtitles.

The subtitle encoder 105 receives input of dynamic range information and color gamut information of the subtitle data. The subtitle encoder 105 inserts the dynamic range information and color gamut information into the subtitle stream SS.

When the subtitle stream SS includes the TTML as text information of subtitles, the subtitle encoder 105 inserts the color gamut information and dynamic range information of the subtitle data using, for example, an element of metadata present in a header of a TTML structure, inserts the color gamut information and dynamic range information of the subtitle data using an element of styling extension present in the header of the TTML structure, or inserts a segment including the color gamut information and dynamic range information of the subtitle data into the subtitle stream SS.

On the other hand, when the subtitle stream SS includes the bitmap data of subtitles, the subtitle encoder 105 inserts a segment including the color gamut information and dynamic range information of the subtitle data into the subtitle stream SS.

In this case, the information indicating the electro-optical transfer characteristic (the transfer function) indicates an electro-optical transfer characteristic of, for example, "BT.709-5 transfer function (HDR1)," "10-bit BT.2020 transfer function (SDR)," "SMPTE 2084 transfer function (HDR1)," or "HDR (HDR2)." Note that "HDR (HDR2)" is for a so-called hybrid gamma, not a PQ curve. In addition, the color gamut information indicates a color gamut of "BT.709-5," "BT.2020," or "SMPTE 428 or XYZ."

The container encoder 106 generates a transport stream (an MPEG-2 transport stream or a transport stream of MMT) including the video stream VS generated by the video encoder 102, the data service stream DS generated by the data service encoder 103, and the subtitle stream SS generated by the subtitle encoder 105. The transmission unit 107 puts the transport stream in a broadcasting wave or packets of a network to be transmitted to the service reception device 200.

At that time, the container encoder 106 inserts identification information indicating the type of transmission video data that the video stream VS included in the transport stream has into the transport stream so that the identification information indicates the type of the transmission video data after switching from the timing a predetermined amount of time or more earlier than the switching timing of the type of the transmission video data. By managing the insertion of the identification information in this way, the reception side is notified of dynamic switching of the transmission video data.

Figure 4:
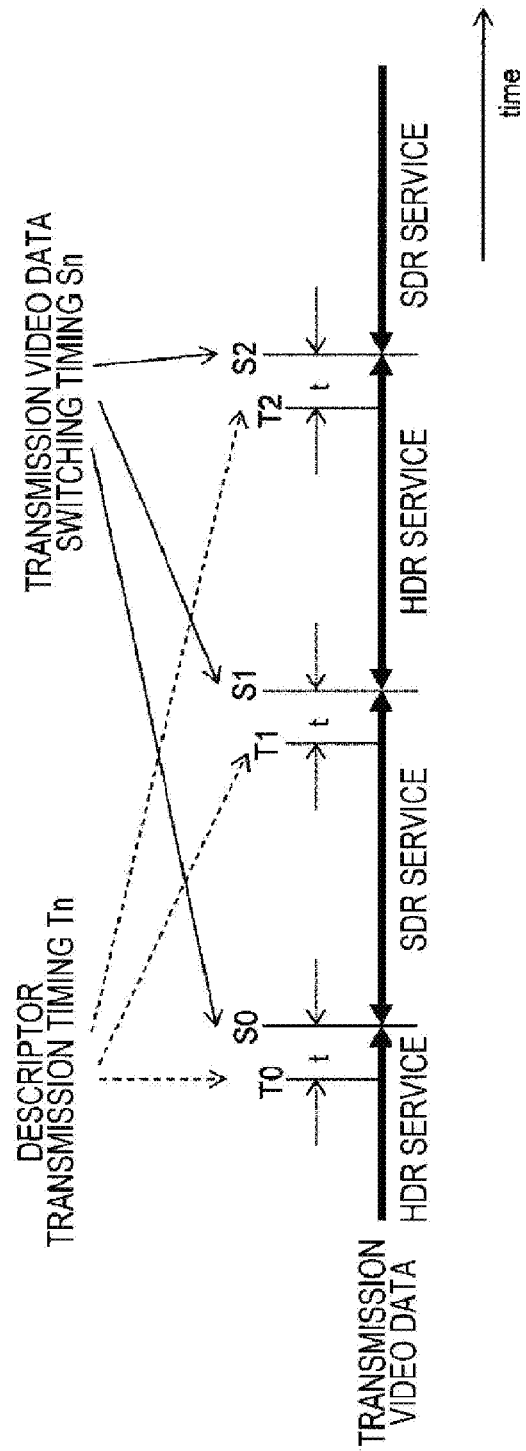
FIG. 4 is a diagram for describing relations between switching timings of transmission video data and insertion timings of identification information for identifying transmission video data after switching.

FIG. 4 shows relations between timings Sn (S0, S1, S2, . . . ) at which SDR transmission video data (an SDR service) and HDR transmission video data (an HDR service) are switched and insertion timings Tn (T0, T1, T2, . . . ) of identification information for identifying transmission video data after the switching. To satisfy the following expression (1), a timing Tn is set as a timing t (a predetermined amount of time) or more earlier than a timing Sn. Note that the illustrated example shows a case in which Sn−Tn=t (here, t is a positive value).

$$Sn-Tn>=t \qquad (1)$$

The container encoder 106 inserts, for example, a newly defined HDR video descriptor (HDR_video_descriptor) to correspond to the video stream VS. When the transport stream is an MPEG-2 transport stream, for example, the descriptor is inserted to be subordinate to a program map table (PMT) or an event information table (EU). In addition, when the transport stream is a transport stream of MMT, the descriptor is inserted to be subordinate to an MMT package table (MP table or MPT), or an event information table (EIT).

FIG. 5 shows an example of a structure (a syntax) of the HDR video descriptor, and FIG. 6 shows content (semantics) of principal information in the structure example. The 8-bit field "descriptor_tag" indicates the type of the descriptor and indicates an HDR video descriptor here. The 8-bit field "descriptor_length" indicates a length (a size) of the descriptor and indicates the number of succeeding bytes as the length of the descriptor.

The 1-bit flag information "HDR_SDR_flag" indicates whether a target stream is an HDR stream or an SDR stream. "1" indicates an HDR stream, and "0" indicates an SDR stream. The 1-bit flag information of "video_characteristics_info_flag" indicates whether characteristic information exists. "1" indicates that characteristic information exists, and "0" indicates that no characteristic information exists.

When the "video_characteristics_info_flag" is "1," 8-bit fields "transferfunction," "color_space," and "referencelevel" exist. The 8-bit field "transferfunction" indicates an electro-optical transfer characteristic (an EOTF characteristic). In other words, this field indicates an electro-optical transfer characteristic corresponding to an opto-electrical transfer characteristic that the transmission video data has. For example, "1" indicates "BT.709-5 transfer function (SDR)," "14" indicates "10-bit BT.2020 transfer function (SDR)," "16" indicates "SMPTE 2084 transfer function (HDR1)," and "25" indicates "HDR (HDR2)." Note that, although "HDR (HDR2)" indicates an HDR electro-optical transfer characteristic, it is considered to be partially compatible with a gamma characteristic and luminance and transmission characteristics of the past, rather than with a PQ curve, or to have characteristics close thereto.

The 8-bit field "color_space" indicates a color space. For example, "1" indicates "BT.709-5," "9" indicates "BT.2020," and "10" indicates "SMPTE 428 or XYZ."

The 8-bit field "referencelevel" indicates a reference level. In this case, a value in a relative range in which values are normalized to "1" at the maximum that is designated to be a value from 0 to 100 is described as the reference level. The reception side recognizes a result obtained by dividing this value by 100 as a normalized relative reference level. The 8-bit field "content peak luminance" indicates a relative luminance value (expressed in %) corresponding to the peak value of transmission codes included in an image. The relative value helps, for example, in control of a knee curve which will be described below.

In addition, the container encoder 106 inserts the type of subtitle data that the subtitle stream SS included in the transport stream has, i.e., identification information indicating whether the data is SDR data or HDR data, into the transport stream so that the identification information indicate the type of subtitle data after switching from the timing a predetermined amount of time or more earlier than a switching timing of the type of the subtitle data. By managing the insertion of the identification information in this way, the reception side is notified of dynamic switching of the subtitle data.

The container encoder 106 inserts, for example, a newly defined HDR subtitle descriptor (HDR_subtitle_descriptor) to correspond to the subtitle stream SS. When the transport stream is an MPEG-2 transport stream, for example, this descriptor is inserted to be subordinate to a program map table (PMT). In addition, when the transport stream is a transport stream of MMT, this descriptor is inserted to be subordinate to an MMT package table (MP table or MPT).

FIG. 7 shows an example of a structure (a syntax) of an HDR subtitle descriptor. The 8-bit field "descriptor_tag" indicates the type of the descriptor and indicates the HDR subtitle descriptor here. The 8-bit field "descriptor_length" indicates the length (the size) of the descriptor and indicates the number of succeeding bytes as the length of the descriptor.

The 1-bit flag information "HDR_SDR_flag" indicates whether a target stream is an HDR stream or an SDR stream. "1" indicates an HDR stream, and "0" indicates an SDR stream. The 1-bit flag field "subtitle_display_characteristics_info_flag" indicates whether characteristic information exists. "1" indicates that characteristic information exists, and "0" indicates that no characteristic information exists. When "subtitle_display_characteristics_info_flag" is 1, the 8-bit fields "transferfunction," "color_space," and "referencelevel" exist.

The 8-bit field "transferfunction" indicates an electro-optical transfer characteristic (an EOTF characteristic). In other words, this field indicates an electro-optical transfer characteristic corresponding to an opto-electrical transfer characteristic that the transmission video data has. For example, "1" indicates "BT.709-5 transfer function (SDR)," "14" indicates "10-bit BT.2020 transfer function (SDR)," "16" indicates "SMPTE 2084 transfer function (HDR1)," and "25" indicates "HDR (HDR2)." Note that, although "HDR (HDR2)" indicates an HDR electro-optical transfer characteristic, it is considered to be partially compatible with a gamma characteristic and luminance and transmission characteristics of the past, rather than with a PQ curve, or to have characteristics close thereto.

The 8-bit field "color_space" indicates a color space. For example, "1" indicates "BT.709-5," "9" indicates "BT.2020," and "10" indicates "SMPTE 428 or XYZ." The 8-bit field "referencelevel" indicates a reference level. In this case, a value in a relative range in which values are normalized to "1" at the maximum that is designated to be a value from 0 to 100 is described as the reference level. The reception side recognizes the result obtained by dividing this value by 100 as the normalized relative reference level.

Figure 8:
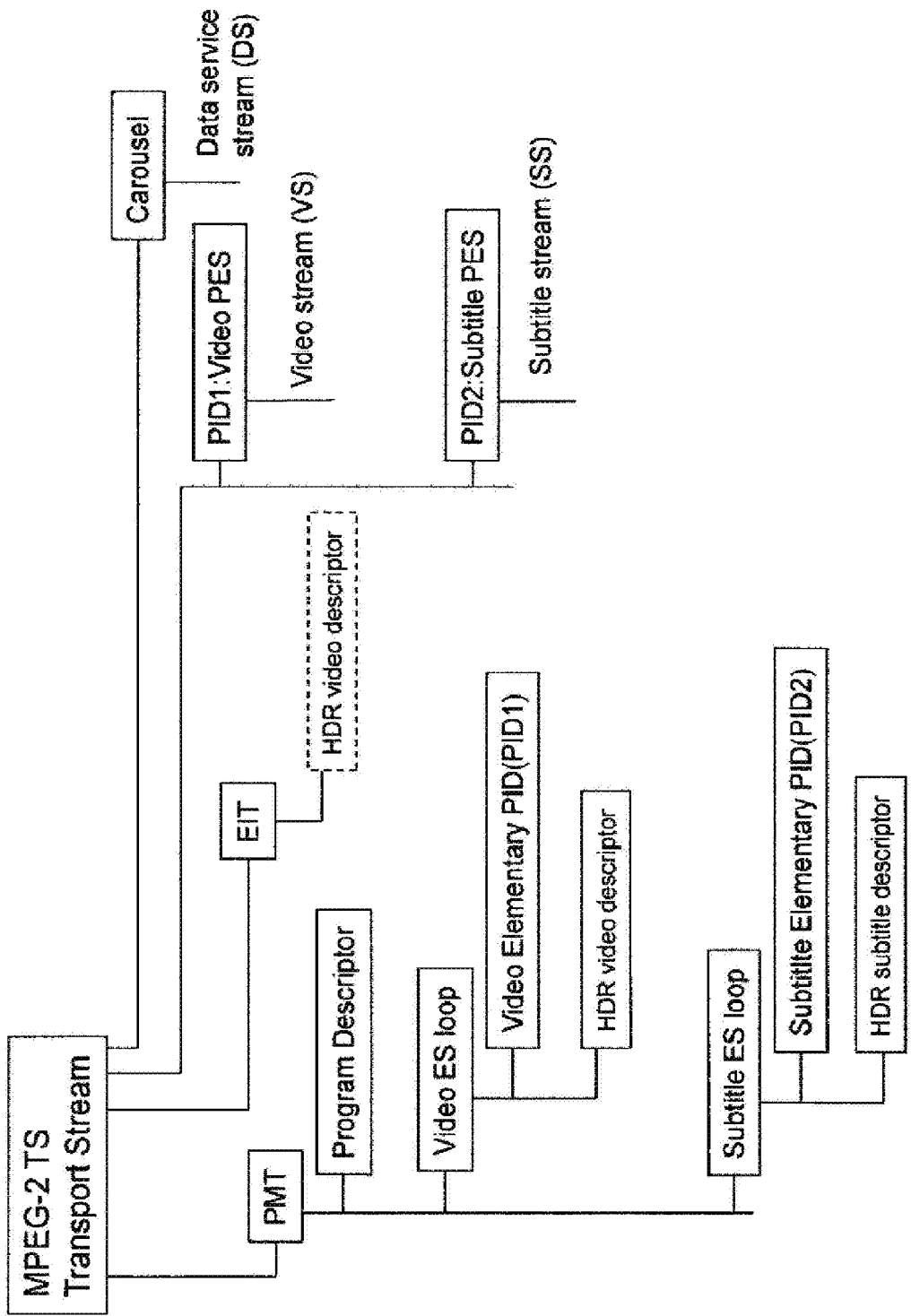
FIG. 8 is a diagram showing an example of a structure of a MPEG-2 transport stream.

FIG. 8 shows an example of a structure of a MPEG-2 transport stream. In this example of the structure, not only do a PES packet of the video stream VS identified as PID1 "Video PES" and a PES packet of the subtitle stream SS identified as PID2 "Subtitle PES" exist, but the data service stream DS transmitted in a carousel scheme also exists. Note that, although the subtitle stream SS is transmitted as a PES as described above and in the carousel scheme like the data service stream, the substance of the subtitle stream SS does not change accordingly.

In addition, a transport stream TS includes a program map table (PMT) as program specific information (PSI). The PSI is information describing a program to which each elementary stream included in the transport stream belongs. The PMT includes a program loop describing information for the entire program.

The PMT has elementary stream loops having information for each elementary stream in. In this structure example, a video elementary stream loop (a video ES loop) corresponding to the video stream VS and a subtitle elementary stream loop (a subtitle ES loop) corresponding to the subtitle stream SS exist.

Information such as a stream type and a packet identifier (PID) of the video stream VS as well as a descriptor describing information with regard to the video stream VS is disposed in the video elementary stream loop. As one type of the descriptor, the above-described HDR video descriptor (sec FIG. 5) is disposed. Note that a structure in which the HDR video descriptor is disposed to be subordinate to an event information table (EIT) as illustrated by the dashed line is also considered.

In addition, information such as a stream type and a packet identifier (PID) of the subtitle stream SS as well as a descriptor describing information with regard to the subtitle stream SS is disposed in the subtitle elementary stream loop. As one type of the descriptor, the above-described HDR subtitle descriptor (see FIG. 7) is disposed.

Figure 9:
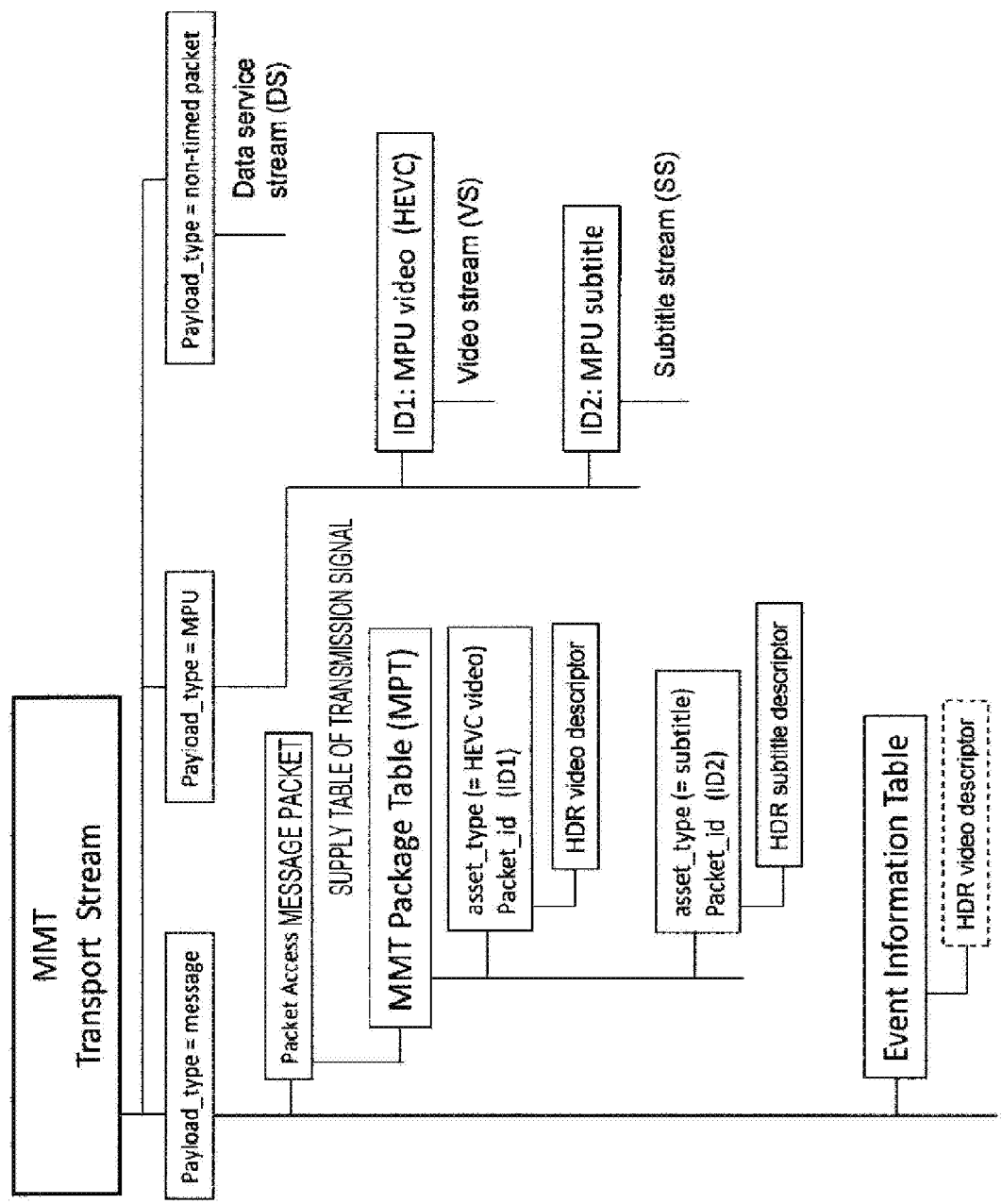
FIG. 9 is a diagram showing an example of a structure of a transport stream of MMT.

FIG. 9 shows an example of a structure of a transport stream of MMT. When the packet type is "MPU," an MPU packet of the video stream VS identified as ID1 "MPU video" and an MPU packet of the subtitle stream SS identified as ID2 "MPU subtitle" are disposed in the transport stream of MMT. In addition, when the packet type is "nontimed packet," the data service stream DS is disposed in the transport stream of MMT.

In addition, when the packet type is "message," various message packets are disposed in the transport stream of MMT. There is a packet access (PA) message packet as one of such message packets. The PA message packet includes a table such as an MPT.

Information such as an asset type (Asset_type) and a packet ID (Packet_id) of the video stream VS serving as an asset as well as a descriptor describing information with regard to the video stream VS is disposed in the MPT. As one type of the descriptor, the above-described HDR video descriptor (see FIG. 5) is disposed. Note that the structure in which the HDR video descriptor is disposed to be subordinate to an event information table (EIT) as illustrated by the dashed line is also considered.

Furthermore, information such as an asset type (Asset_type) and a packet ID (Packet_id) of the subtitle stream SS serving as an asset as well as a descriptor describing information with regard to the subtitle stream SS is disposed in the MPT. As one type of the descriptor, the above-described HDR subtitle descriptor (see FIG. 7) is disposed.

An operation of the service transmission system 100 shown in FIG. 2 will be briefly described. Transmission video data as well as dynamic range information and color gamut information of the transmission video data is input to the video encoder 102. Here, the dynamic range information is information indicating an electro-optical transfer characteristic (a transfer function) corresponding to an opto-electrical transfer characteristic that the transmission video data has.

The transmission video data input as described above is obtained by switching between a plurality of types of transmission video data. The plurality of types of transmission video data include, for example, SDR transmission video data obtained by applying an SDR opto-electrical transfer to SDR video data, and HDR transmission video data obtained by applying an HDR opto-electrical transfer to HDR video data.

The video encoder 102 performs encoding, for example, MPEG4-AVC or HEVC on the transmission video data to obtain encoded video data, and generates a video stream VS as a component stream including the encoded video data. The video stream VS includes the transmission video data as component data.

In addition, upon generating the video stream VS as described above, the video encoder 102 inserts the dynamic range information and the color gamut information into the video stream VS. In this case, meta information such as information indicating the electro-optical transfer characteristic (the transfer function) corresponding to the opto-electrical transfer characteristic that the transmission video data has, the color gamut information of the transmission video data, and information indicating a reference level is inserted into a video usability information (VUI) region of an SPS NAL unit of an access unit (AU). In addition, an SEI message having the meta information such as the information indicating the electro-optical transfer characteristic (the transfer function) corresponding to the opto-electrical transfer characteristic that the transmission video data has, and the information of the reference level is inserted into the "SEI" part of the access unit (AU).

Further, image data as well as dynamic range information and color gamut information of the image data is input to the still image encoder 104. Here, the dynamic range information is the information indicating the electro-optical transfer characteristic (the transfer function) corresponding to the opto-electrical transfer characteristic that the transmission video data has.

The still image encoder 104 performs, for example, JPEG encoding on the image data to obtain encoded video data. At this time, the dynamic range information and the color gamut information are inserted into the encoded data. In this case, for the information indicating the electro-optical transfer characteristic (the transfer function), for example, a value of a gamma tag stipulated in the Exchangeable image file format (Exit) standard defined in the JPEG standard is used to be inserted. In addition, for the color gamut information, for example, a value of a color space tag stipulated in the Exif standard defined in the JPEG standard is used to be inserted.

Further, graphics data as well as dynamic range information and color gamut information of the graphics data are input to the data service encoder 103. Here, the dynamic range information is the information indicating the electro-optical transfer characteristic (the transfer function) corresponding to the opto-electrical transfer characteristic that the transmission video data has. The encoded data obtained by the still image encoder 104 is further input to the data service encoder 103.

The data service encoder 103 performs an encoding process on the graphics data and further on the encoded data input from the still image encoder 104, and thereby generates a data service stream DS as a component stream. The data service stream DS includes the image data and the graphics data as component data.

Furthermore, upon generating the data service stream DS as descried above, the data service encoder 103 inserts the dynamic range information and the color gamut information into the data service stream DS. In this case, for the information indicating the electro-optical transfer characteristic (the transfer function), for example, dynamic range information "D_range" is expanded, defined, and inserted thereinto. In addition, for the color gamut information, for example, the item of "gfx.color_management.mode" is used to be inserted thereinto.

In addition, the subtitle encoder 105 receives subtitle data as well as dynamic range information and color gamut information of the subtitle data. Here, the dynamic range information is the information indicating the electro-optical transfer characteristic (the transfer function) corresponding to the opto-electrical transfer characteristic that the transmission video data has.

The subtitle encoder 105 performs an encoding process on the subtitle data, and thereby generates a subtitle stream SS as a component stream. The subtitle stream SS includes the subtitle data (subtitle text information such as TTML or subtitle bitmap data) as component data.

Furthermore, upon generating the subtitle stream SS as described above, the subtitle encoder 105 inserts the dynamic range information and the color gamut information into the subtitle stream SS.

Here, when the subtitle stream SS includes TTML as subtitle text information, the color gamut information and the dynamic range information of the subtitle data are inserted using, for example, an element of metadata present in a header of a TTML structure. In addition, when the subtitle stream SS includes the subtitle bitmap data, a segment including the color gamut information and the dynamic range information of the subtitle data, for example, is inserted into the subtitle stream SS.

The video stream VS generated by the video encoder 102, the data service stream DS generated by the data service encoder 103, and the subtitle stream SS generated by the subtitle encoder 105 are supplied to the container encoder 106. The container encoder 106 generates a transport stream (an MPEG-2 transport stream or a transport stream of MMT) including these streams.

In addition, upon generating the transport stream as described above, the container encoder 106 inserts identification information indicating the type of the transmission video data that the video stream VS included in this transport stream has into the transport stream so that the identification information indicates the type of the transmission video data after switching from a timing the predetermined amount of time or more earlier than a switching timing of the video stream VS. Specifically, the HDR video descriptor (see FIG. 5) is inserted to correspond to the video stream VS. In addition, the container encoder 106 further inserts the HDR subtitle descriptor (see FIG. 7) into the transport stream to correspond to the subtitle stream SS.

The transport stream generated by the container encoder 106 is supplied to the transmission unit 107. The transmission unit 107 puts the transport stream in a broadcasting wave or packets of a network to transmit the transport stream to the service reception device 200.

(Configuration Example of Service Reception Device)

Figure 10:
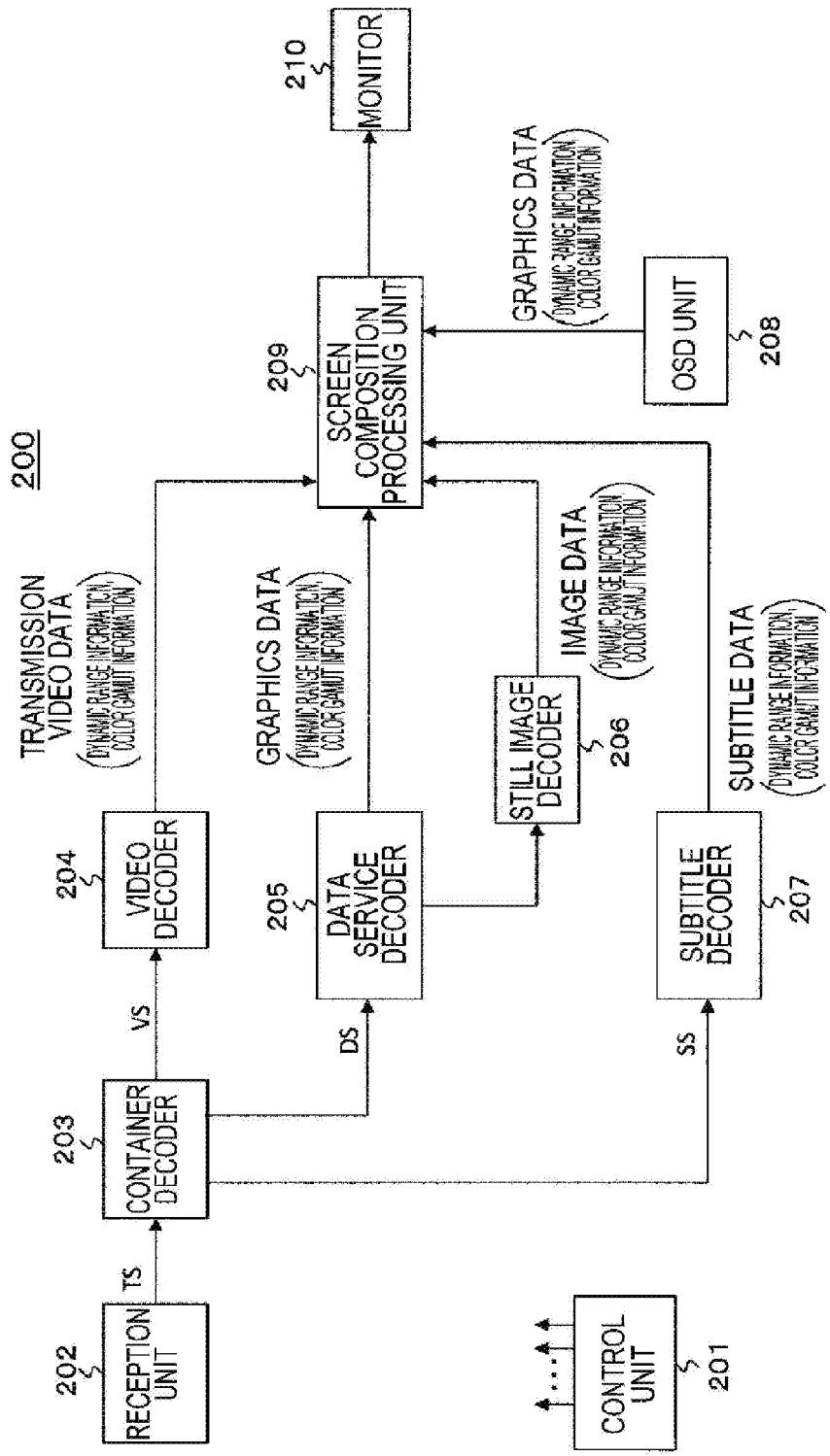
FIG. 10 is a block diagram showing an example of a structure of a service reception device.

FIG. 10 shows an example of a structure of the service reception device 200. This service reception device 200 has a control unit 201, a reception unit 202, a container decoder 203, a video decoder 204, a data service decoder 205, a still image decoder 206, a subtitle decoder 207, an OSD (On-screen display) unit 208, a screen composition processing unit 209, and a monitor 210.

The control unit 201 is configured to include a central processing unit (CPU) to control operations of the units of the service reception device 200 using a control program. The reception unit 202 receives a transport stream (an MPEG-2 transport stream or a transport stream of MMT) serving as a container put in a broadcasting wave or packets of a network and transmitted by the service transmission system 100 (see FIG. 2). The container decoder 203 extracts a video stream VS, a data service stream DS, and a subtitle stream SS from the transport stream.

In addition, the container decoder 203 extracts various kinds of information inserted into the transport stream and transmits the information to the control unit 201. This information includes the above-described HDR video descriptor (see FIG. 5) and HDR subtitle descriptor (see FIG. 7) describing identification information of transmission video data.

The control unit 201 recognizes whether the transmission video data included in the video stream VS is SDR transmission video data or HDR transmission video data based on a description of the HDR video descriptor. As described above, the identification information for identifying the type of the transmission video data has been inserted into the transport stream so that the identification information indicates the type of the transmission video data after switching from a timing the predetermined amount of time or more earlier than the switching timing of the type of the transmission video data.

In addition, the control unit 201 recognizes the type of subtitle data that the subtitle stream SS has, i.e., whether the subtitle data is SDR data or HDR data, based on the description of the HDR subtitle descriptor. Identification information indicating the type of the subtitle data is inserted into the transport stream so that the identification information indicates a type of the transmission video data after switching from a timing the predetermined amount of time or more earlier than the switching timing of the type of the subtitle data, as described above.

The video decoder 204 performs a decoding process on the video stream VS extracted by the container decoder 203 to obtain the transmission video data as well as dynamic range information and color gamut information of the transmission video data. Here, the dynamic range information is information indicating an electro-optical transfer characteristic (a transfer function) corresponding to an opto-electrical transfer characteristic that the transmission video data has.

The data service decoder 205 performs a decoding process on the data service stream DS extracted by the container decoder 203 to obtain graphics data (bitmap data), dynamic range information and color gamut information of the graphics data and encoded data of image data. The still image decoder 206 performs a decoding process on the encoded data obtained by the data service decoder 205 to obtain the image data as well as dynamic range information and color gamut information of the image data.

The subtitle decoder 207 performs a decoding process on the subtitle stream SS extracted by the container decoder 203 to obtain subtitle data (bitmap data) as well as dynamic range information and color gamut information of the subtitle data. The OSD unit 208 outputs graphics data (bitmap data) for OSD (On-screen display) as well as the dynamic range information and color gamut information of the graphics data.

The screen composition processing unit 209 performs compositing on the transmission video data obtained by the video decoder 204, the graphics data obtained by the data service decoder 205, the image data obtained by the still image decoder 206, the subtitle data obtained by the subtitle decoder 207, and the graphics data obtained by the OSD unit 208, and thereby generates display image data corresponding to display performance of the monitor 210. The monitor 210 displays an image based on the display image data, having display performance such as HDR and a wide color gamut or SDR and a standard color gamut.

The screen composition processing unit 209 performs a luminance mapping process on each piece of the data based on the dynamic range information of the data to match the display performance and performs compositing thereon. In addition, the screen composition processing unit 209 performs a color gamut conversion process on each piece of the data based on the color gamut information of the data to match the display performance and performs compositing thereon.

Figure 11:
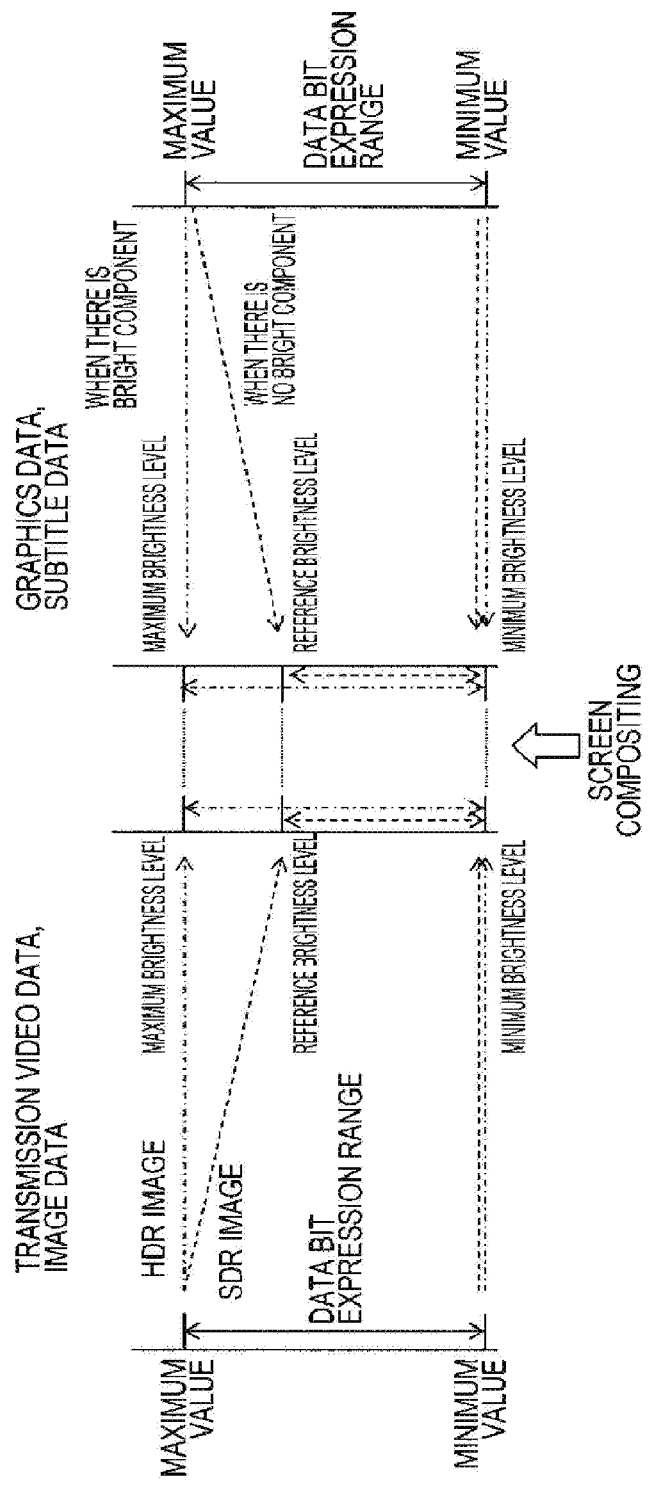
FIG. 11 is a diagram showing an overview of a luminance mapping process when display performance is HDR.

FIG. 11 shows an overview of the luminance mapping process when the display performance is HDR. The luminance mapping process is performed on the transmission video data and the image data such that, when the dynamic range information indicates HDR, a maximum value of a data bit expression range corresponds to a maximum brightness level, and when the dynamic range information indicates SDR, the maximum value of the data bit expression range corresponds to a reference brightness level.

In addition, the luminance mapping process is performed on the graphics data and the subtitle data such that, when the dynamic range information indicates HDR, i.e., when the data has bright components, the maximum value of the data bit expression range corresponds to the maximum brightness level, and when the dynamic range information indicates SDR, i.e., when the data has no bright components, the maximum value of the data bit expression range corresponds to the reference brightness level.

As reference brightness level of this case, a reference brightness level (referencelevel; see FIG. 5) set to correspond to the transmission video data and the image data, for example, can be used, and a reference brightness level (referencelevel; see FIG. 7) set to correspond to the graphics data and the subtitle data, for example, can be used. Furthermore, in this case, the reference brightness level (referencelevel) set to correspond to the transmission video data and the image data can be used for the transmission video data and the image data, and the reference brightness level (referencelevel) set to correspond to the graphics data and the subtitle data can be used for the graphics data and the subtitle data. In addition, although the reference brightness level may be 100 nits (100% luminance), brightness thereof is not limited. The reference brightness level may be set in advance to, for example, 200 nits (200% luminance), 300 nits (300% luminance), or the like.

Figure 12:
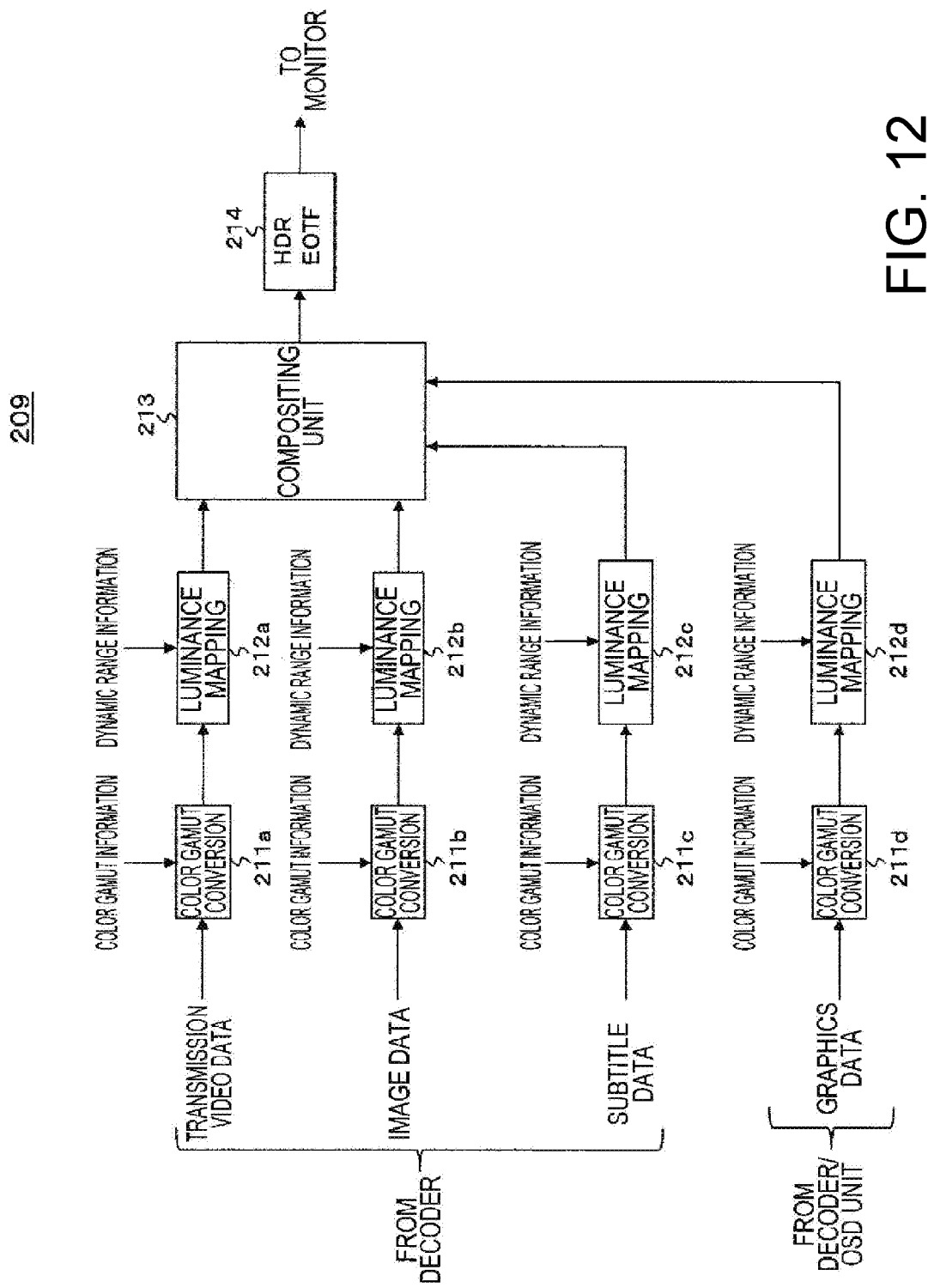
FIG. 12 is a block diagram showing an example of a structure of a screen composition processing unit when display performance is HDR and has a wide color gamut.

FIG. 12 shows an example of a structure of the screen composition processing unit 209 when display performance is HDR and has wide color gamut. This screen composition processing unit 209 has color gamut conversion units 211a, 211b, 211c, and 211d, luminance mapping units 212a, 212b, 212c, and 212d, a compositing unit 213, and an HDR electro-optical transfer unit 214.

The transmission video data supplied from the video decoder 204 is supplied to a series circuit of the color gamut conversion unit 211a and the luminance mapping unit 212a. The color gamut conversion unit 211a converts the color gamut of the transmission video data into a wide color gamut to match the display performance of a display based on the color gamut information. For example, when the color gamut of the transmission video data is "BT.709-5=sRGB" and the color gamut that matches the display performance is "BT.2020=ITUR2020," the color gamut of the transmission video data is converted from "BT.709-5" to "BT.2020." Note that, when the color gamut of the transmission video data is the same as the wide color gamut that matches the display performance, the color gamut conversion unit 211a does nothing substantial, and outputs the input data as it is.

Figure 13:
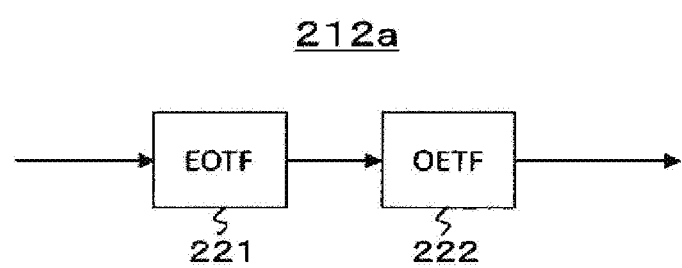
FIG. 13 is a diagram for describing a configuration of a luminance mapping unit.

The luminance mapping unit 212a performs luminance mapping to cause the transmission video data to match a HDR display performance based on its dynamic range information. The luminance mapping unit 212a is constituted by a series circuit of an electro-optical transfer unit (an EOTF unit) 221 and an opto-electrical transfer unit (an OETF unit) 222 as shown in FIG. 13.

The electro-optical transfer unit (the EOFT unit) 221 performs a transfer on the input transmission video data to change an opto-electrical transfer characteristic (an OETF characteristic) applied to this transmission video data into a linear optical space characteristic. The opto-electrical transfer unit (the OETF unit) 222 performs an opto-electrical transfer on the output data of the electro-optical transfer unit 221 based on the opposite opto-electrical transfer characteristic (the OETF characteristic) to the electro-optical transfer characteristic (the EOTF characteristic) of the HDR electro-optical transfer unit 214.

Here, a case in which the input transmission video data is SDR transmission video data will be described. In this case, the luminance mapping unit 212a performs the luminance mapping process to convert the SDR transmission video data into HDR transmission video data. In this case, the luminance mapping unit 212a, which is configured as a series circuit of an SDR electro-optical transfer unit 231 and an HDR opto-electrical transfer unit 232 as shown in FIG. 14 (a), performs a conversion from an SDR bit space into an HDR bit space based on the reference brightness level.

The SDR electro-optical transfer unit 231 performs an electro-optical transfer on the SDR transmission video data based on an SDR electro-optical transfer characteristic indicated by arrow a in FIG. 14 (b). In this case, luminance levels 0 to 100% of the input SDR transmission video data hit 100 nits (=100 cd/m$^2$) at maximum in a linear optical space. Here, "100 nits" indicates brightness of the reference level. Note that the brightness of the reference level is not limited to 100 nits, and may be, for example, 200 nits or 300 nits. This also applies to the following other examples.

In addition, the HDR opto-electrical transfer unit 232 performs an opto-electrical transfer based on an HDR opto-electrical transfer characteristic indicated by arrow b in FIG. 14 (c). In this case, output data of the SDR electro-optical transfer unit 231 is re-assigned to 0 to 100% in the transmission range of 0 to N*100%. Accordingly, the SDR transmission video data, which has been expressed in a fully encoded bit, is concentrated on a part of the transmission range after being re-assigned as HDR transmission video data.

Next, a case in which the input transmission video data is HDR transmission video data and an opto-electrical transfer characteristic (an OETF characteristic) that the HDR transmission video data has does not coincide with the opposite characteristic of the electro-optical transfer characteristic (the EOTF characteristic) in the HDR electro-optical transfer unit 214 will be described. Note that, when the opto-electrical transfer characteristic that the HDR transmission video data has coincides with the opposite characteristic of the electro-optical transfer characteristic in the HDR electro-optical transfer unit 214, the luminance mapping unit 212a does nothing substantial, and outputs the input data as it is.

In this case, the luminance mapping unit 212a performs the luminance mapping process to convert the data from HDR1 transmission video data into HDR2 transmission video data. In this case, the luminance mapping unit 212a is configured as a series circuit of an HDR1 electro-optical transfer unit 241 and an HDR2 opto-electrical transfer unit 242 as shown in FIG. 15 (a).

The HDR1 electro-optical transfer unit 241 performs an electro-optical transfer on the HDR1 transmission video data based on an HDR1 electro-optical transfer characteristic indicated by arrow a in FIG. 15 (b). In this case, luminance levels in the transmission range of 0 to N*100% of the input HDR1 transmission video data correspond to N*100 nits (=K1) at maximum in a linear optical space.

In addition, when N*100% of HDR1 is greater than M*100% of HDR2 in this case as illustrated, the HDR1 electro-optical transfer unit 241 performs a luminance conversion on electro-optical transfer input signals so that the signal in the luminance levels in the range of 100 to N*100% has luminance levels in the range of 100 to M*100% as indicated by a knee curve (indicated by arrow b in FIG. 15 (b)). Note that, in FIG. 15 (b), "K1" indicates the luminance value [nits] corresponding to N*100%, and "K2 indicates the luminance value [nits] corresponding to M*100%. Note that, although it is not illustrated, no such luminance conversion is performed when N*100% of HDR1 is equal to or lower than M*100% of HDR2.

In addition, the HDR2 opto-electrical transfer unit 242 performs an opto-electrical transfer based on an HDR2 opto-electrical transfer characteristic indicated by arrow c of FIG. 15 (c). In this case, output data of the HDR1 electro-optical transfer unit 241 is re-assigned in the entire transmission range of 0 to M*100%.

Returning to FIG. 12, the image data supplied from the still image decoder 206 is supplied to a series circuit of the color gamut conversion unit 211b and the luminance mapping unit 212b. The color gamut conversion unit 211b converts the color gamut of the image data into a wide color gamut based on its color gamut information to match the display performance. The luminance mapping unit 212b performs luminance matching on this image data to match the HDR display performance based on its dynamic range information. Note that, since details of the color gamut conversion unit 211b and the luminance mapping unit 212b are similar to those of the color gamut conversion unit 211a and the luminance mapping unit 212a corresponding to the above-described transmission video data, they are omitted.

In addition, the subtitle data supplied from the subtitle decoder 207 is supplied to a series circuit of the color gamut conversion unit 211c and the luminance mapping unit 212c. The color gamut conversion unit 211c converts the color gamut of the subtitle data into a wide color gamut based on its color gamut information to match the display performance. The luminance mapping unit 212c performs luminance mapping on the subtitle data based on its dynamic range information to match the HDR display performance. Note that, since details of the color gamut conversion unit 211c and the luminance mapping unit 212c are similar to those of the color gamut conversion unit 211a and the luminance mapping unit 212a corresponding to the above-described transmission video data, they are omitted.

Furthermore, the graphics data supplied from the data service decoder 205 or the OSD unit 208 is supplied to a series circuit of the color gamut conversion unit 211d and the luminance mapping unit 212d. The color gamut conversion unit 211d converts the color gamut of the graphics data into a wide color gamut based on its color gamut information to match the display performance. The luminance mapping unit 212d performs luminance mapping on the graphics data based on its dynamic range information to match the HDR display performance. Note that, since details of the color gamut conversion unit 211d and the luminance mapping unit 212d are similar to those of the color gamut conversion unit 211a and the luminance mapping unit 212a corresponding to the above-described transmission video data, they are omitted.

The transmission video data, the image data, the subtitle data, and the graphics data that have undergone the processes of color gamut conversion and luminance mapping are supplied to the compositing unit 213. Although detailed description of the compositing unit 213 is omitted, the compositing unit performs compositing on the data based on screen configuration information. Output data of the compositing unit 213 is supplied to the HDR electro-optic al transfer unit 214. The HDR electro-optical transfer unit 214 performs an electro-optical transfer on the output data of the compositing unit 213 based on the HDR electro-optical transfer characteristic, and thereby obtains display image data appropriate for the HDR display performance with a wide color gamut.

Note that an example in which the monitor 210 has the HDR display performance with a wide color gamut and the screen composition processing unit 209 obtains display image data appropriate for the HDR display performance with a wide color gamut has been described. When the monitor 210 has SDR display performance with a normal color gamut such as sRGB, the screen composition processing unit 209 is configured to obtain display image data appropriate for the SDR display performance with a normal color gamut.

In this case, each of the color gamut conversion units of the screen composition processing unit 209 shown in FIG. 12 converts the color gamut of each piece of data into the normal color gamut that matches the display performance based on the color gamut information. In addition, each of the luminance mapping units of the screen composition processing unit 209 shown in FIG. 12 performs luminance matching on each piece of the data to match the SDR display performance based on the dynamic range information. Note that the HDR electro-optical transfer unit 214 serves as an SDR electro-optical transfer unit in the screen composition processing unit 209 shown in FIG. 12.

Here, a case in which the input transmission video data is HDR transmission video data will be described. In this case, the luminance mapping units perform the luminance mapping process, and thereby convert the HDR transmission video data into SDR transmission video data. In this case, each luminance mapping units is constituted by a series circuit of an HDR electro-optical transfer unit 251 and an SDR opto-electrical transfer unit 252 as shown in FIG. 16 (a).

The HDR electro-optical transfer unit 251 performs an electro-optical transfer on the HDR transmission video data based on the HDR electro-optical transfer characteristic indicated by arrow a in FIG. 16 (b). In this case, the luminance levels in the transmission range of 0 to N*100% of the input HDR transmission video data hit N*100 nits (=100 cd/m$^2$) at maximum in a linear optical space.

In addition, in this case, the HDR electro-optical transfer unit 251 further performs a luminance conversion on an electro-optical transfer input signal so that the signal in the range from a luminance level at P %, which is lower than 100%, to the luminance level at N*100% has luminance levels in the transmission range equal to or lower than 100% in the SDR OETF as indicated by a knee curve (indicated by arrow h of FIG. 16 (b)).

Furthermore, the SDR opto-electrical transfer unit 252 performs an opto-electrical transfer based on an SDR opto-electrical transfer characteristic indicated by arrow c in FIG. 16 (c). In this case, the output data of the HDR electro-optical transfer unit 251 is re-assigned in the entire transmission range of 0 to 100%.

An operation of the service reception device 200 shown in FIG. 10 will be briefly described. The reception unit 202 receives a transport stream (an MPEG-2 transport stream or a transport stream of MMT) put in a broadcasting wave or packets of a network and transmitted from the service transmission system 100. The transport stream is supplied to the container decoder 203. The container decoder 203 extracts a video stream VS, a data service stream DS, and a subtitle stream SS from the transport stream.

In addition, the container decoder 203 extracts various kinds of information inserted into the transport stream serving as a container, and transmits the information to the control unit 201. This information also includes the HDR video descriptor (see FIG. 5) and HDR subtitle descriptor (see FIG. 7) described above.

The control unit 201 recognizes whether transmission video data included in the video stream VS is SDR transmission video data or HDR transmission video data based on description of the HDR video descriptor. In addition, the control unit 201 recognizes the type of subtitle data that the subtitle stream SS has, i.e., whether its type is SDR data or HDR data, based on the description of the HDR subtitle descriptor.

The video stream VS extracted by the container decoder 203 is supplied to the video decoder 204. The video decoder 204 performs a decoding process on the video stream VS, and thereby obtains the transmission video data as well as dynamic range information and color gamut information of the transmission video data.

In addition, the data service stream DS extracted by the container decoder 203 is supplied to the data service decoder 205. The data service decoder 205 performs a decoding process on the data service stream DS, and thereby obtains graphics data (bitmap data) as well as dynamic range information and color gamut information of the graphics data, and also obtains encoded data of image data.

The encoded data of the image data obtained by the data service decoder 205 is supplied to the still image decoder 206. The still image decoder 206 performs a decoding process on the encoded data, and thereby obtains the image data as well as dynamic range information and color gamut information of the image data.

Furthermore, the subtitle stream SS extracted by the container decoder 203 is supplied to the subtitle decoder 207. The subtitle decoder 207 performs a decoding process on the subtitle stream SS, and thereby obtains subtitle data (bitmap data) as well as dynamic range information and color gamut information of the subtitle data.

The transmission video data obtained by the video decoder 204, the graphics data obtained by the data service decoder 205, the image data obtained by the still image decoder 206, the subtitle data obtained by the subtitle decoder 207, and the graphics data obtained by the OSD unit 208 are supplied to the screen composition processing unit 209 along with their dynamic range information and color gamut information.

The screen composition processing unit 209 performs compositing on the data, and thereby generates display image data appropriate for the display performance of the monitor 210. In this case, each piece of the data undergoes a color gamut conversion process based on the color gamut information of the data to match the display performance, further undergoes a luminance mapping process based on the dynamic range information of the data to match the display performance, and then undergoes compositing. The display image data generated by the screen composition processing unit 209 is supplied to the monitor 210, and the monitor 210 displays an image based on the display image data.

As described above, in the transmission and reception system 10 shown in FIG. 1, the service transmission system 100 inserts dynamic range information of component data (transmission video data, image data, graphics data, and subtitle data) that each component stream has into each of the component streams (a video stream VS, a data service stream DS, and a subtitle stream SS). Thus, a reception side can perform a luminance mapping process on each piece of the component data based on its dynamic range information to match display performance and perform compositing thereon to obtain output data.

In this case, since the characteristic of the electro-optical transfer performed on this output data can be fixed (see the HDR electro-optical transfer unit 214 of FIG. 12), occurrence of an image disturbance caused by switching of the electro-optical transfer characteristic can be prevented. For example, when an image based on video data is displayed along with graphics display, even if the image based on the video data is switched from SDR to HDR or from HDR to SDR, the graphics display shows no change in color or brightness. In addition, in that case, a luminance mapping process is performed on each piece of component data to match display performance, and therefore display based on the component data can be performed in a proper luminance state at all times.

Figure 17A:
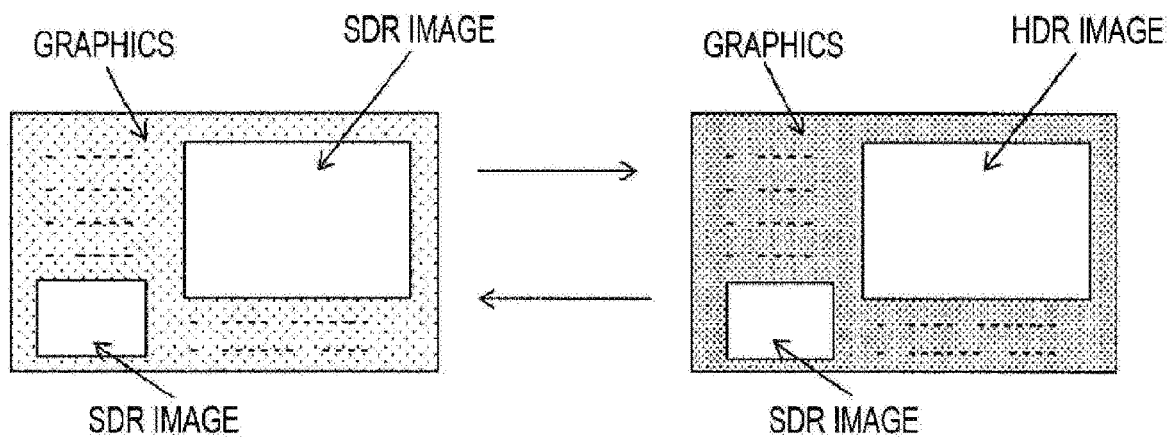
FIG. 17(a) and FIG. 17(b) are diagrams showing an example of graphics display through an operation of a "d button" which is provided as one of broadcasting services.
Figure 17B:
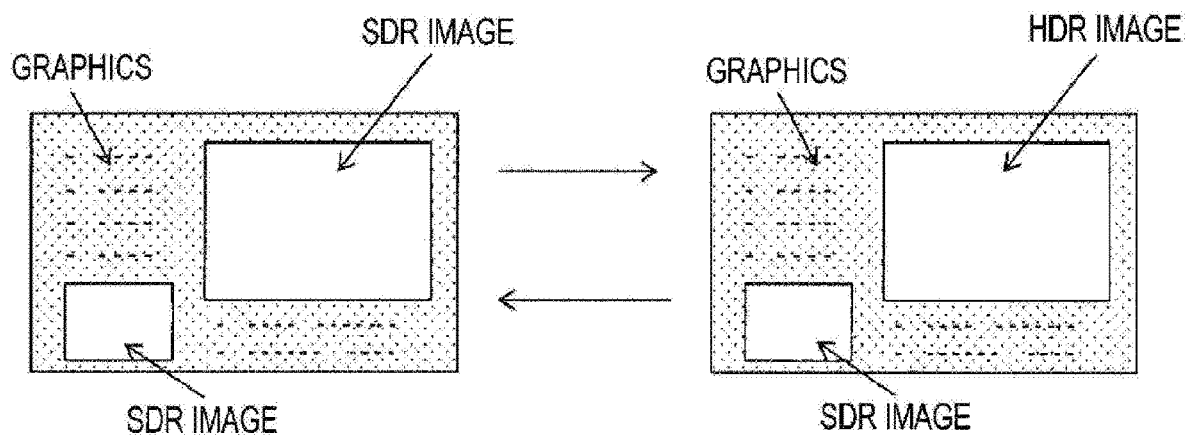

For example, FIGS. 17 (a) and (b) show examples of graphics display through an operation of a so-called "d button" that is provided as one of broadcasting services. A dynamic image based on transmission video data is displayed in a small window on an upper right side, and a still image based on image data is displayed on a lower left side.

FIG. 17 (a) is of an example of a case in which characteristics of an electro-optical transfer performed on the transmission video data are switched according to whether the transmission video data is SDR transmission video data or HDR transmission video data. In this case, color and luminance of the graphics display are affected when switching between an SDR image display time and an HDR image display time is performed.

FIG. 17 (b) is an example of a case in which characteristics of an electro-optical transfer performed on the transmission video data are fixed regardless of whether the transmission video data is SDR transmission video data or HDR transmission video data as in an embodiment of the present technology. In this case, color and luminance of the graphics display are not affected when switching between an SDR image display time and an HDR image display time is performed.

In addition, in the transmission and reception system 10 shown in FIG. 1, the service transmission system 100 inserts color gamut information of component data that each of component streams has into the component streams. Thus, the reception side can obtain output data by performing a color gamut conversion on the component data based on its color gamut information to match display performance and compositing thereon, and therefore display based on the component data can be performed in a proper color state at all times.

2. Modified Example

Note that, although the transmission and reception system 10 constituted by the service transmission system 100 and the service reception device 200 has been introduced in the above-described embodiment, a configuration of the transmission and reception system to which the present technology can be applied is not limited thereto. For example, the service reception device 200 may be constituted by, for example, a set-top box (STB) connected with a digital interface such as HighDefinition Multimedia Interface (HDMI) and a monitor. Note that "HDMI" is a registered trademark.

In addition, the example in which the container is an MPEG-2 TS (an MPEG-2 transport stream) or a transport stream of MPEG Media Transport (MMT) has been introduced in the above-described embodiment. However, a container to which the present technology can be applied is not limited thereto, and a container in another format such as MP4 may be used.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A transmission device including:

a transmission unit that transmits a container in a predetermined format including a first component stream that has, as component data, transmission video data obtained by switching between a plurality of types of transmission video data, and a predetermined number of second component streams that have pieces of other component data; and an information insertion unit that inserts dynamic range information of the component data that each of the component streams has into the component streams.

(2)

The transmission device according to (1), wherein the information insertion unit further inserts color gamut information of the component data that each of the component streams has into the component streams.

(3)

The transmission device according to (1) or (2), further including:

another information insertion unit that inserts identification information indicating a type of transmission video data that the first component stream included in the container has into a layer of the container so that the identification information indicates a type of the transmission video data after the switching from a timing a predetermined amount of time or more earlier than a switching timing.

(4)

The transmission device according to any of (1) to (3), wherein the predetermined number of second component streams include a data broadcasting stream and/or a subtitle stream.

(5)

A transmission method including:

transmitting, by a transmission unit, a container in a predetermined format including a first component stream that has, as component data, transmission video data obtained by switching between a plurality of types of transmission video data, and a predetermined number of second component streams that have pieces of other component data; and inserting dynamic range information of the component data that each of the component streams has into the component streams.

(6)

A reception device including:

a reception unit that receives a container in a predetermined format including a first component stream that has, as component data, transmission video data obtained by switching between a plurality of types of transmission video data, and a predetermined number of second component streams that have pieces of other component data; and a processing unit that obtains output data by decoding each of the component streams, thus obtaining a plurality of pieces of component data, and then performing compositing of the obtained plurality of pieces of component data, wherein dynamic range information of the component data that each of the component streams has is inserted into the component streams, and the processing unit obtains the output data by performing a luminance mapping process on each piece of the component data based on the dynamic range information of each piece of the component data to match display performance, and then performing compositing of the component data.

(7)

The reception device according to (6), wherein color gamut information of the component data that each of the component streams has is inserted into the component streams, and the processing unit obtains the output data by performing a color gamut conversion process on each piece of the component data based on the color gamut information of each piece of the component data to match display performance, and then performing compositing of the component data.

(8)

A reception method including:

receiving, by a reception unit, a container in a predetermined format including a first component stream that has, as component data, transmission video data obtained by switching between a plurality of types of transmission video data, and a predetermined number of second component streams that have pieces of other component data; and obtaining output data by decoding each of the component streams, thus obtaining a plurality of pieces of component data, and then performing compositing of the obtained plurality of pieces of component data,
wherein dynamic range information of the component data that each of the component streams has is inserted into the component streams, and
the output data is obtained in the processing by performing a luminance mapping process on each piece of the component data based on the dynamic range information of each piece of the component data to match display performance, and then performing compositing of the component data.

(9)
A transmission device including:
circuitry configured to
transmit information in a predetermined format that includes
a first component stream that has, as component data, video data obtained by switching between a plurality of types of video data, and
at least one second component stream that includes other component data; and
insert dynamic range information of the component data into the first component stream and insert dynamic range information of the other component data into respective of the at least one second component stream.

(10)
The transmission device according to (9),
wherein the information is a container in the predetermined format.

(11)
The transmission device according to (10),
wherein the container in the predetermined format is a MPEG-2 transport stream (TS) or a transport stream of MPEG Media Transport (MMT).

(12)
The transmission device according to (11),
wherein the circuitry is further configured to insert color gamut information of the component data into the first component stream and insert color gamut information of the other component data into respective of the at least one second component stream.

(13)
The transmission device according to (11), wherein
the circuitry is further configured to insert identification information in the first component stream, the identification information included at a position in the first component stream that occurs at a predetermined amount of time prior to a switching event, and the identification information identifies a type of video data that is included in the first component stream after the switching event, the switching event switches one type of video data to another.

(14)
The transmission device according to (11),
wherein the at least one second component stream includes a data broadcasting stream and/or a subtitle stream.

(15)
A transmission method including
transmitting, by a transmitter, information in a predetermined format that includes a first component stream that has, as component data, video data obtained by switching between a plurality of types of video data, and
at least one second component stream that includes other component data; and
inserting with circuitry dynamic range information of the component data into the first component stream and inserting dynamic range information of the other component data into respective of the at least one second component stream.

(16)
A reception device including
a receiver configured to receive information in a predetermined format that includes
a first component stream that has, as component data, video data obtained by switching between a plurality of types of video data, and,
at least one second component stream that includes other component data; and
circuitry configured to decode the first component stream and the at least one second component stream to obtain output data, wherein the circuitry is configured to obtain from the first component stream dynamic range information of the component data and obtain from the other component data other dynamic range information of the at least one second component stream, and
perform a luminance mapping process on the component data based on the dynamic range information of the component data and based on the other dynamic range information of the other component data to match display performance, and obtain the output data by combining respective outputs of the luminance mapping process.

(17)
The reception device according to (16), further including
a display configured to display an image associated with the output data.

(18)
The reception device according to (16), wherein
color gamut information of the component data is included in the first component stream and other color gamut information is included in the at least one second component stream, and
the circuitry is configured perform a color gamut conversion process based on the color gamut information and the other color gamut information to match display performance, and then obtain the output data by combining the component data and the other component data.

(19)
A reception method including:
receiving, with a receiver, information in a predetermined format that includes
a first component stream that has, as component data, video data obtained by switching between a plurality of types of video data, and,
at least one second component stream that includes other component data; and
decoding the first component stream and the at least one second component stream to obtain output data,
the decoding including obtaining from the first component stream dynamic range information of the component data and obtaining from the other component data other dynamic range information from the at least one second component stream, and
performing a luminance mapping process on the component data based on the dynamic range information of the component data and based on the other component data of the other dynamic range information to match display performance, and obtaining the output data by combining respective outputs of the luminance mapping process.

A major characteristic of the present technology is that dynamic range information of component data that each of component streams has is inserted into the component streams and transmitted, thereby a reception side can fix a characteristic of an electro-optical transfer, and thus occurrence of an image disturbance caused by switching of the electro-optical transfer characteristic can be prevented (see FIG. 2).

REFERENCE SIGNS LIST 10 transmission and reception system
100 service transmission system
101 control unit
102 video encoder
103 data service encoder
104 still image encoder
105 subtitle encoder
106 container encoder
107 transmission unit
200 service reception device
201 control unit
202 reception unit
203 container decoder
204 video decoder
205 data service decoder
206 still image decoder
207 subtitle decoder
208 OSD unit
209 screen composition processing unit
210 monitor
211a, 211b, 211c, 211d color gamut conversion unit
212a, 212b, 212c, 212d luminance mapping unit
213 compositing unit
214 HDR electro-optical transfer unit
221 electro-optical transfer unit (EOTF unit)
222 opto-electrical transfer unit (OETF unit)
231 SDR electro-optical transfer unit
232 HDR opto-electrical transfer unit
241 HDR1 electro-optical transfer unit
242 HDR2 opto-electrical transfer unit
251 HDR electro-optical transfer unit
252 SDR opto-electrical transfer unit

The invention claimed is:

1. A transmission device, comprising:
circuitry configured to:
generate a video stream that includes video data;
generate a subtitle stream that includes subtitle data;
insert first control information into the video stream, the first control information including first dynamic range information of the video data or first color gamut information of the video data;
insert second control information into the subtitle stream, the second control information including second dynamic range information of the subtitle data or second color gamut information of the subtitle data;
generate a container that includes the video stream with the inserted first control information, and the subtitle stream with the inserted second control information; and
transmit the container.

2. The transmission device according to claim 1, wherein the container is a MPEG-2 transport stream (TS) or a transport stream of MPEG Media Transport (MMT).

3. The transmission device according to claim 1, wherein the subtitle data includes text information of a subtitle or bitmap data of the subtitle.

4. The transmission device according to claim 1, wherein the circuitry is further configured to insert identification information into the container, the identification information being inserted at a position in the video stream prior to a switching event, the identification information indicating a video format of the video data after the switching event, and the switching event corresponding to switching from one video format to another video format.

5. The transmission device according to claim 1, wherein the circuitry is configured to insert the first control information into Sequence Parameter Set (SPS) level signaling of the video stream.

6. A reception device, comprising:
a receiver configured to receive a container that includes
a video stream that includes video data and first control information, the first control information including first dynamic range information of the video data or first color gamut information of the video data, and
a subtitle stream that includes subtitle data and second control information, the second control information including second dynamic range information of the subtitle data or second color gamut information of the subtitle data; and
circuitry configured to:
decode the video stream and the subtitle stream to obtain the video data, the subtitle data, the first control information, and the second control information;
perform a first luminance mapping process on the video data based on the first control information and a second luminance mapping process on the subtitle data based on the second control information to obtain display image data; and
output the display image data for display.

7. The reception device according to claim 6, further comprising:
a display configured to display the display image data, wherein the display image data is obtained according to display performance of the display.

8. The reception device according to claim 6, wherein the circuitry is configured to perform a first color gamut conversion process on the video data based on the first control information or a second color gamut conversion process on the subtitle data based on the second control information to obtain the display image data.

9. The reception device according to claim 6, wherein the container is a MPEG-2 transport stream (TS) or a transport stream of MPEG Media Transport (MMT).

10. The reception device according to claim 6, wherein the subtitle data includes text information of a subtitle or bitmap data of the subtitle.

11. The reception device according to claim 6, wherein the circuitry is configured to extract the first control information from Sequence Parameter Set (SPS) level signaling of the video stream.

12. A reception method, comprising:
receiving, by a receiver of a reception device, a container that includes
a video stream that includes video data and first control information, the first control information including first dynamic range information of the video data or first color gamut information of the video data, and
a subtitle stream that includes subtitle data and second control information, the second control information including second dynamic range information of the subtitle data or second color gamut information of the subtitle data;
decoding, by processing circuitry of the reception device, the video stream and the subtitle stream to obtain the video data, the subtitle data, the first control information, and the second control information;

performing a first luminance mapping process on the video data based on the first control information and a second luminance mapping process on the subtitle data based on the second control information to obtain display image data; and outputting the display image data for display.

13. The reception method according to claim 12, further comprising:

displaying, by a display, the display image data, wherein the display image data is obtained according to display performance of the display.

14. The reception method according to claim 12, further comprising:

performing a first color gamut conversion process on the video data based on the first control information or a second color gamut conversion process on the subtitle data based on the second control information to obtain the display image data.

15. The reception method according to claim 12, wherein the container is a MPEG-2 transport stream (TS) or a transport stream of MPEG Media Transport (MMT).

16. The reception method according to claim 12, wherein the subtitle data includes text information of a subtitle or bitmap data of the subtitle.

17. The reception method according to claim 12, wherein the decoding the video stream comprises extracting the first control information from Sequence Parameter Set (SPS) level signaling of the video stream.

* * * * *